United States Patent
Johnson et al.

(10) Patent No.: US 10,906,124 B2
(45) Date of Patent: Feb. 2, 2021

(54) SWING ARM ASSEMBLY WITH LIFT ASSEMBLY

(71) Applicant: G.E. Schmidt, Inc., Blue Ash, OH (US)

(72) Inventors: Drew Sherlock Johnson, Montgomery, OH (US); Andrew Ryan Johnson, Cincinnati, OH (US); Jonathan Michael Dutton, Cincinnati, OH (US); Steven Mathew Daviaux, Somerville, OH (US); Dilshan Thilina Modaragamage, Barrie (CA)

(73) Assignee: G.E. SCHMIDT, INC., Blue Ash, OH (US)

( * ) Notice: Subject to any disclaimer, the term of this patent is extended or adjusted under 35 U.S.C. 154(b) by 295 days.

(21) Appl. No.: 15/891,393

(22) Filed: Feb. 8, 2018

(65) Prior Publication Data
US 2018/0221983 A1 Aug. 9, 2018

Related U.S. Application Data

(60) Provisional application No. 62/457,017, filed on Feb. 9, 2017.

(51) Int. Cl.
*B23K 11/30* (2006.01)
*B23K 11/11* (2006.01)

(52) U.S. Cl.
CPC ...... *B23K 11/3063* (2013.01); *B23K 11/3072* (2013.01); *B23K 11/11* (2013.01)

(58) Field of Classification Search
CPC ............ B23K 11/3063; B23K 11/3072; B32K 11/314

USPC ....... 219/86.8, 130.21, 125, 1, 85.19, 78.14, 219/121.82, 136; 294/81.2, 81.62, 902, 294/164, 168

See application file for complete search history.

(56) References Cited

U.S. PATENT DOCUMENTS

| | | | |
|---|---|---|---|
| 2,357,038 A | 8/1944 | Whitesell, Jr. | |
| 4,642,212 A | 2/1987 | Bailey | |
| 5,884,549 A | 3/1999 | Hosono et al. | |
| 6,561,056 B2 | 5/2003 | Maffeis | |
| 6,722,004 B2 * | 4/2004 | Recupero ........... | B23K 11/3063 29/33 R |
| 9,744,626 B2 * | 8/2017 | Lee ................... | B23K 11/3072 |
| 2008/0317577 A1 | 12/2008 | Hopkins et al. | |

(Continued)

FOREIGN PATENT DOCUMENTS

DE 20306568 U1 10/2004
DE 202014004183 U1 9/2014

(Continued)

OTHER PUBLICATIONS

Thomas, Shane; International Search Report and Written Opinion of the International Searching Authority issued in International Application No. PCT/US2016/055667; dated Feb. 7, 2017; 11 pages.

(Continued)

*Primary Examiner* — Lien M Ngo
(74) *Attorney, Agent, or Firm* — Ulmer & Berne LLP

(57) ABSTRACT

A swing arm assembly is provided for a spot welding machine. The swing arm assembly can accommodate a tip dresser or a tip exchanger and can include a lift assembly that can translate the tip dresser from a first position to a second position along a lateral axis.

14 Claims, 30 Drawing Sheets

(56) References Cited

U.S. PATENT DOCUMENTS

| | | | |
|---|---|---|---|
| 2011/0133501 A1* | 6/2011 | Yeum | B25J 15/0061 |
| | | | 294/81.2 |
| 2013/0174683 A1 | 7/2013 | Roberts | |
| 2014/0360993 A1* | 12/2014 | Yeum | B23K 11/115 |
| | | | 219/125.1 |
| 2017/0095881 A1 | 4/2017 | Johnson et al. | |
| 2018/0221983 A1 | 8/2018 | Johnson et al. | |

FOREIGN PATENT DOCUMENTS

| | | |
|---|---|---|
| EP | 2223765 A1 | 9/2010 |
| FR | 2750631 A1 | 1/1998 |
| JP | 62173089 A | 7/1987 |
| JP | 10006034 A | 1/1998 |
| JP | 2000263246 A | 9/2000 |
| JP | 2002172472 A | 6/2002 |
| WO | 9951389 A1 | 10/1999 |

OTHER PUBLICATIONS

GE Schmidt Inc.; "ProLine Tip Dress Swing Arm"; Online publication, including two embedded videos and embedded Info Sheet; Jun. 10, 2014; retrieved from http://www.geschmidt.com/proline-tip-dress-swing-arm on Feb. 27, 2017; 2 pages.

Tip Dreser CDK-R video, uploaded on Feb. 5, 2009; video retrieved from https://www.youtube.com/watch?v=aCwKw1Ni8Tk on Mar. 25, 2015; 1 page.

Pepperl+Fuchs; Welding Tips, Welding Caps Inspection on Welding Robots video, uploaded on Jan. 27, 2009; video retrieved from https://www.youtube.com/watch?v=oHd5w6WxQgw; 1 page.

GE Schmidt Proline Swing Arm video, uploaded May 31, 2013; video retrieved from https://www.youtube.com/watch?v=sAqgF1axkUY; 1 page.

GE Schmidt ProLine Swing Arm video, uploaded Feb. 4, 2014; video retrieved from https://www.youtube.com/watch?v=7-1_pODiNqE; 1 page.

* cited by examiner

SWING ARM ASSEMBLY WITH LIFT ASSEMBLY

REFERENCE TO RELATED APPLICATIONS

The present application claims priority of U.S. provisional application Ser. No. 62/457,017, filed Feb. 9, 2017, entitled Swing Arm Assembly with Lift Kit and hereby incorporates the same application herein by reference in its entirety.

BACKGROUND

In spot welding, the electrode tips (weld tips) can get worn and dirty and are thus cleaned periodically to maintain good quality welds. When the weld gun is carried by a robot, the robot can bring the gun to the tip dresser for cleaning. However, some weld guns are fix mounted and thus utilize a swing arm that brings the tip dresser to the electrode tips for cleaning.

SUMMARY

In accordance with one embodiment, a swing arm for one or more of a tip dresser and a tip exchanger for a spot welding machine is provided. The swing arm comprises a base, an arm, and a head. The arm is pivotally coupled with the base. The head is coupled with the arm and comprises a support plate and a lift assembly. The lift assembly comprises a mounting plate and a slidable plate. The mounting plate is coupled with the support plate. The slidable plate is slidably coupled with the mounting plate and is configured to accommodate one or more of a tip dresser and a tip exchanger. The slidable plate is slidable with respect to the mounting plate along an axis.

In accordance with another embodiment, a lift assembly for a swing arm for one or more of a tip dresser and a tip exchanger for a spot welding machine is provided. The lift assembly comprises a mounting plate and a slidable plate. The mounting plate is coupled with the support plate. The slidable plate is slidably coupled with the mounting plate and is configured to accommodate one or more of a tip dresser and a tip exchanger. The slidable plate is slidable with respect to the mounting plate along an axis.

In accordance with another embodiment, a swing arm for one or more of a tip dresser and a tip exchanger for a spot welding machine is provided. The swing arm comprises a base, an arm, and a head. The arm is pivotally coupled with the base. The head is coupled with the arm and comprises a support plate and a lift assembly. The lift assembly comprises a mounting plate, a slidable plate, an actuator, and a rail and a track. The mounting plate is coupled with the support plate. The slidable plate is slidably coupled with the mounting plate and is configured to accommodate one or more of a tip dresser and a tip exchanger. The slidable plate is slidable with respect to the mounting plate along an axis. The actuator is coupled with the mounting plate and is configured to facilitate selective sliding of the slidable plate with respect to the mounting plate. The actuator comprises a piston that is engaged with the mounting plate. The rail and the track cooperate with each other to facilitate sliding of the slidable plate with respect to the mounting plate. The mounting plate comprises a flange that is engaged with the piston. the mounting plate defines a slot and the flange extends through the slot.

BRIEF DESCRIPTION OF THE DRAWINGS

Various embodiments will become better understood with regard to the following description, appended claims and accompanying drawings wherein:

DETAILED DESCRIPTION

Figure 1:
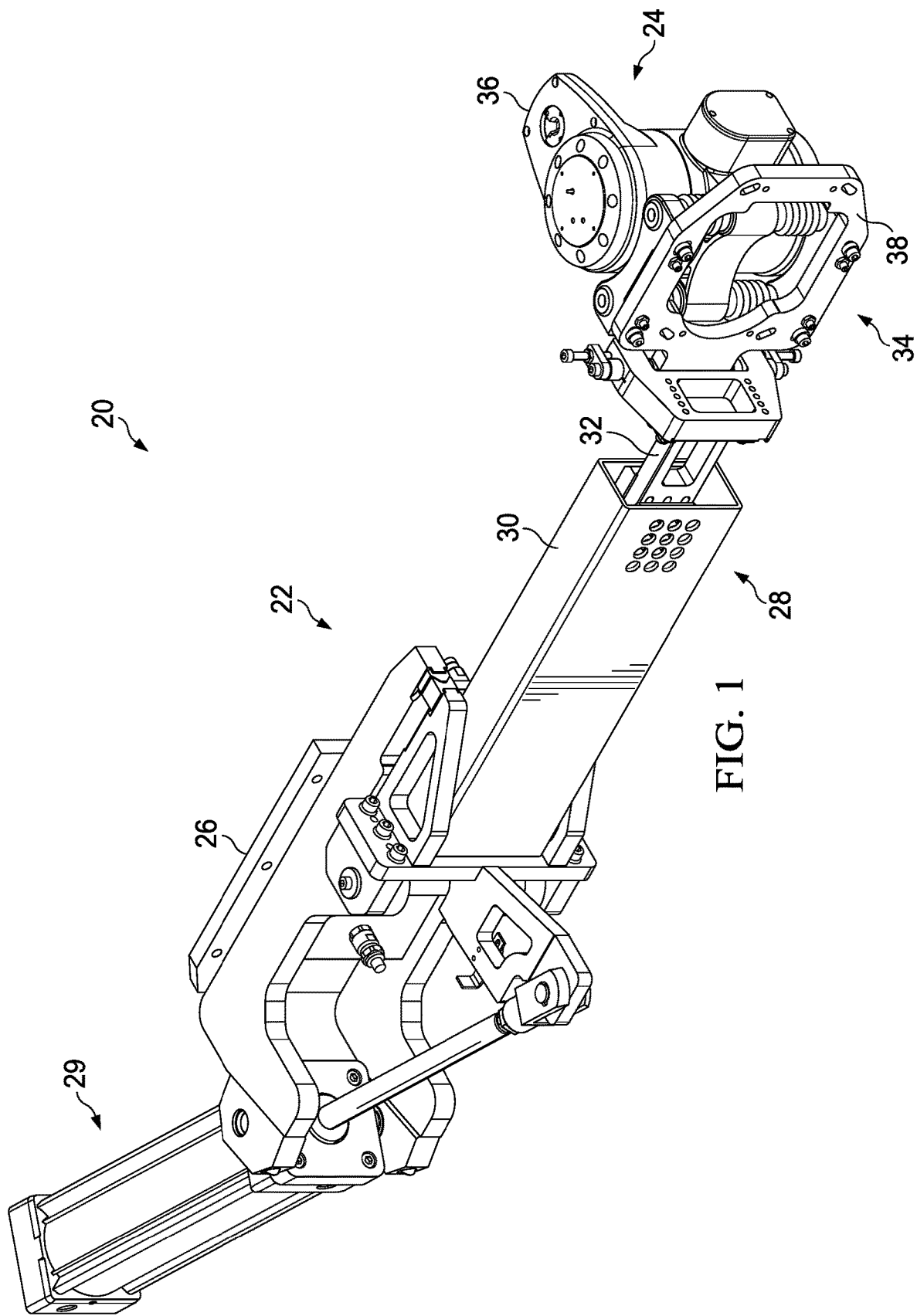
FIG. 1 is a perspective view of a swing arm assembly according to one embodiment, having a tip dresser coupled to the swing arm assembly.
Figure 2:
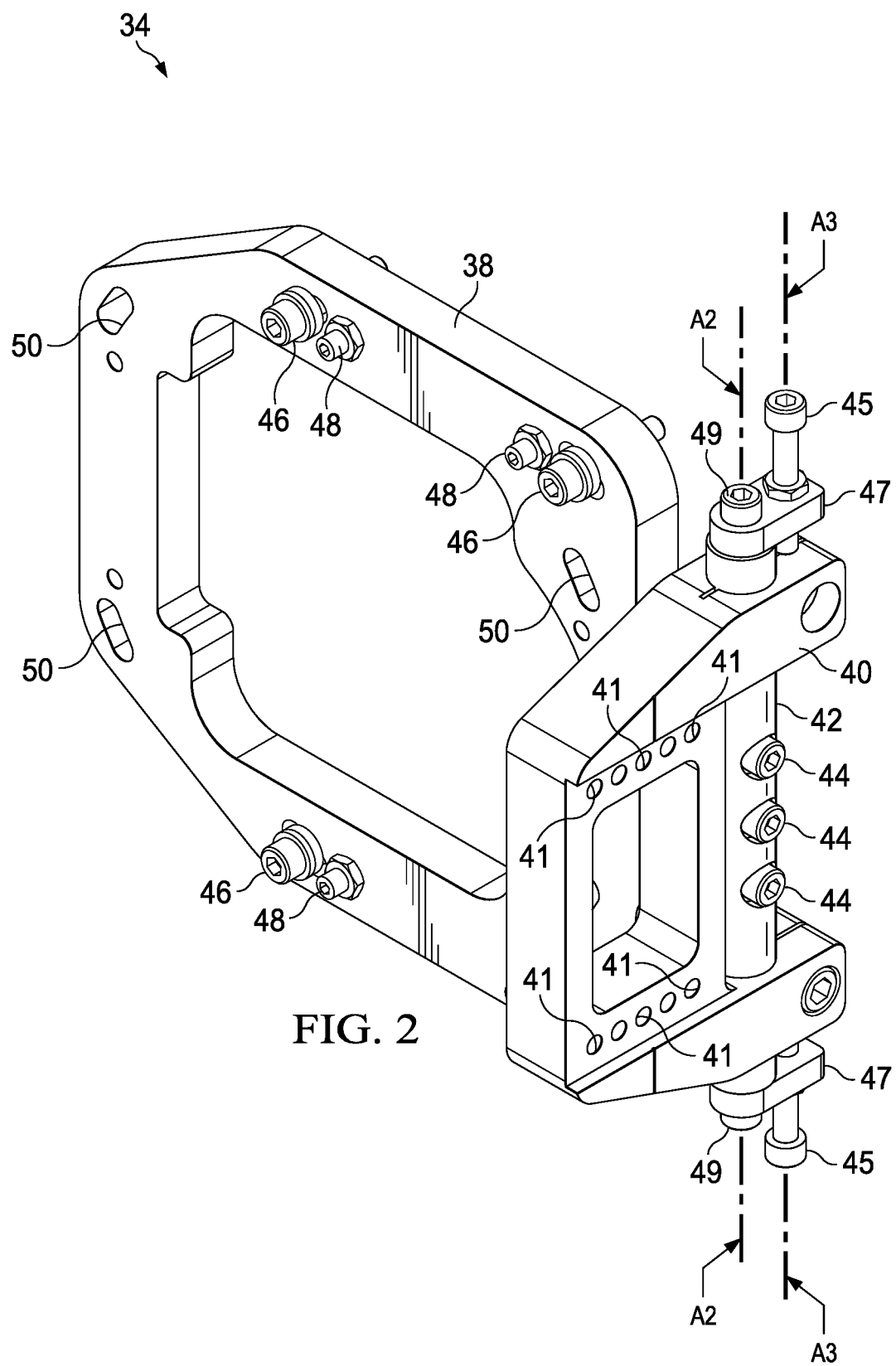
FIGS. 2-5 are various views depicting a head of the swing arm assembly.

Embodiments are hereinafter described in detail in connection with the views and examples of FIGS. 1-33, wherein like numbers indicate the same or corresponding elements throughout the views. As illustrated in FIG. 1, a swing arm assembly 20 is provided that can include a swing arm 22 and a tip dresser 24. The swing arm 22 can selectively position the tip dresser 24 with respect to welding tips of a spot welder (not shown) to facilitate cleaning/dressing of the welding tips. The swing arm 22 can include a mounting base 26, an arm assembly 28 pivotally coupled to the mounting base 26, and a driver cylinder 29 pivotally coupled to the mounting base 26. The driver cylinder 29 can operably mounted to the arm assembly 28 to facilitate in pivoting of the arm assembly 28 with respect to the mounting base 26. In one embodiment, the driver cylinder 29 can be a pneumatic drive. In other embodiments, any of a variety of drives can be used to facilitate powered pivoting of the arm assembly 28, such as, for example, a servo, a rotary servo drive, a gear box drive, a linear electric drive, and a hydraulic drive. The arm assembly 28 can include an arm 30, an extendible arm mount 32, and a head 34. The extendible arm mount 32 can be slidably coupled with the arm 30 and slidable between a retracted position and an extended position. The head 34 can be mounted to the extendable arm mount 32 and can be configured to accommodate the tip dresser 24.

The mounting base 26 can facilitate mounting of the swing arm assembly 20 to with fasteners (e.g., with bolts), to a floor, or at any of a variety of other suitable locations that allow the tip dresser 24 to interact properly with the spot welding machine (not shown). For example, when the spot welding machine is operating, the swing arm 22 can be in a stand-by position, such that the tip dresser 24 remains out of the operational zone of the spot welding machine. Once the welding tips are ready for dressing, the spot welding machine can cease spot welding, and the swing arm 22 can pivot the tip dresser 24 into position (via operation of the driver cylinder 29 and/or sliding of the extendible arm mount 32). The spot welding machine can then bring the welding tips into contact with a cleaning mechanism 36 on the tip dresser 24 to facilitate dressing of the welding tips. In one embodiment, the swing arm 22 can move the tip dresser 24 into place without requiring substantial movement of the spot welder. In another embodiment, the swing arm 22 and the spot welding machine can move together such that they meet at a predetermined location.

Figure 3:
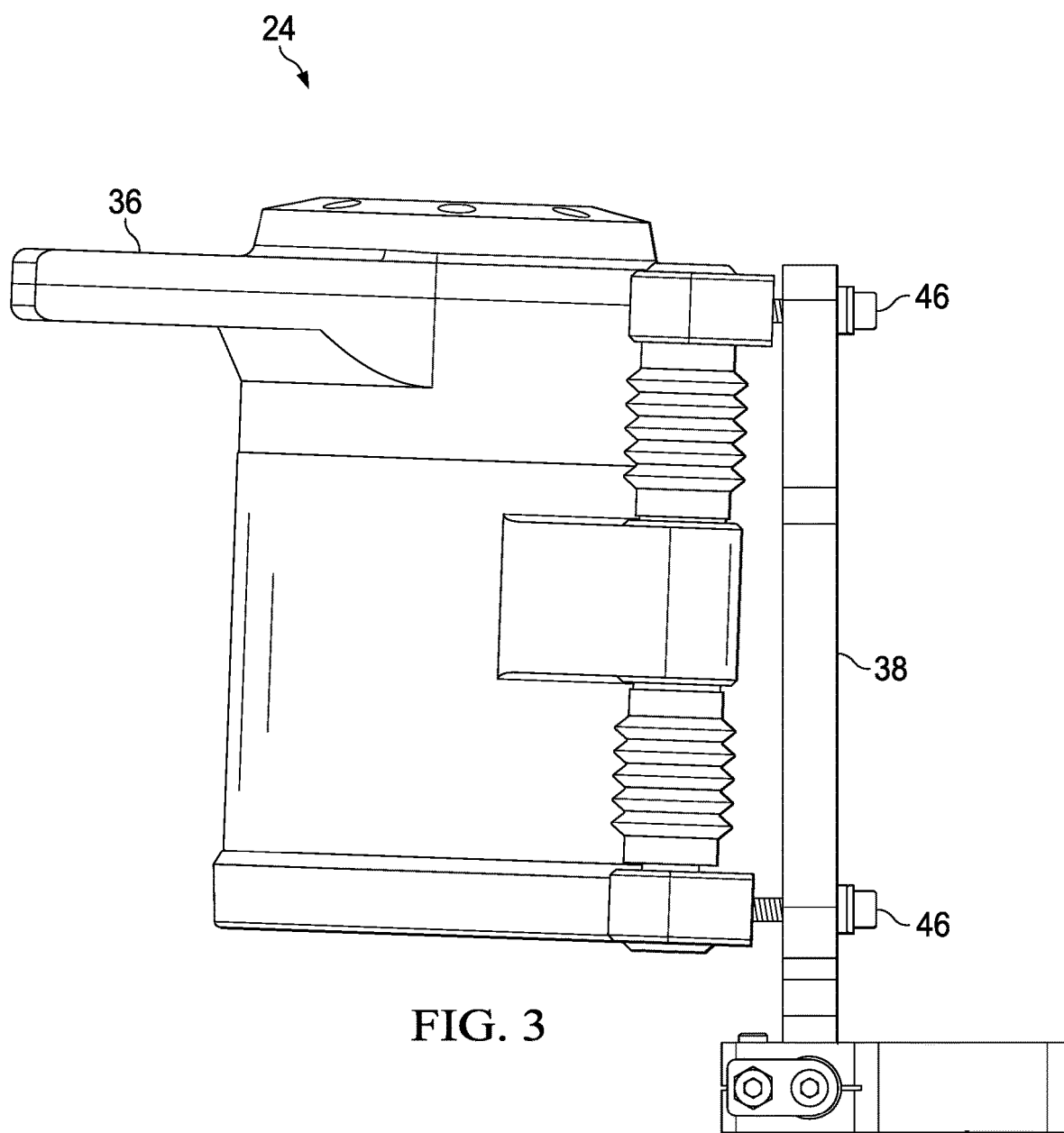
Figure 4:
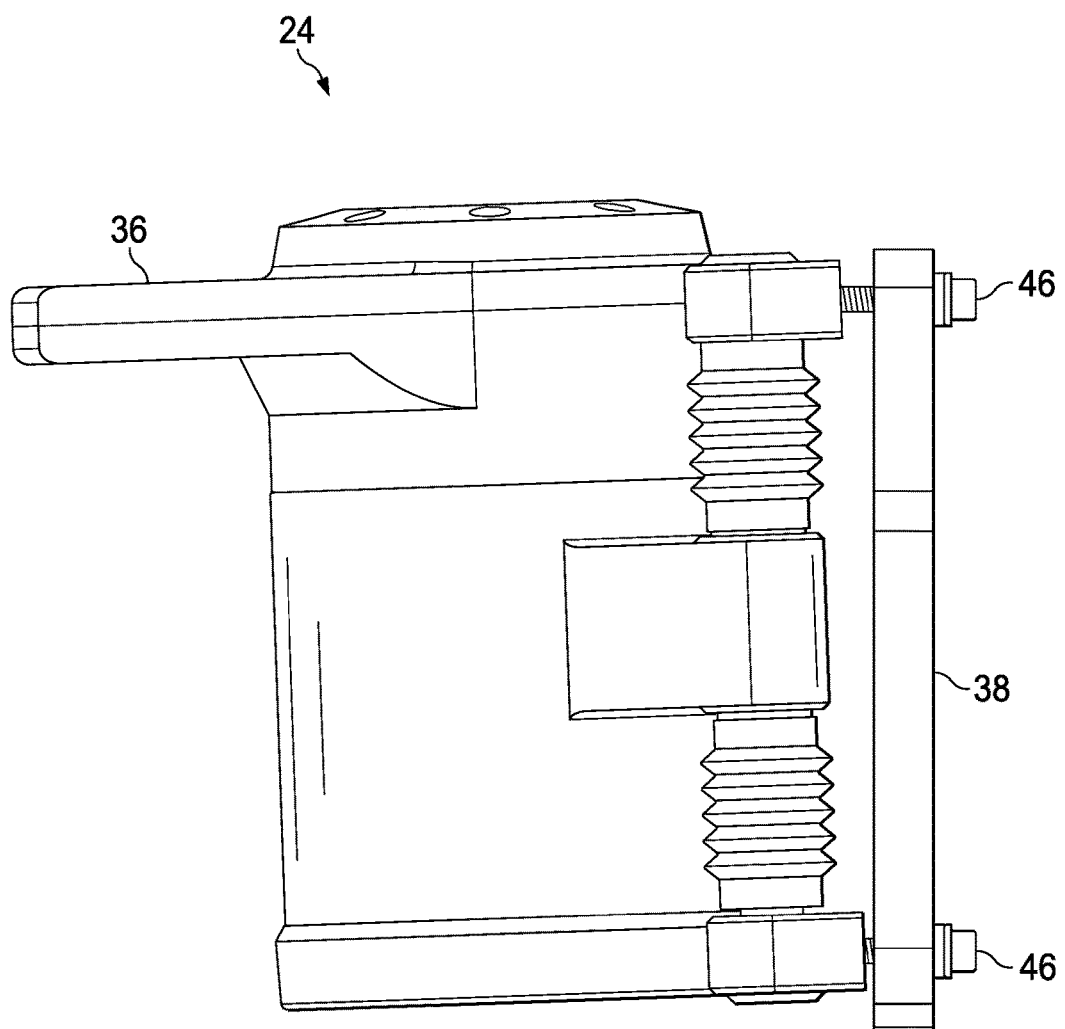
Figure 5:
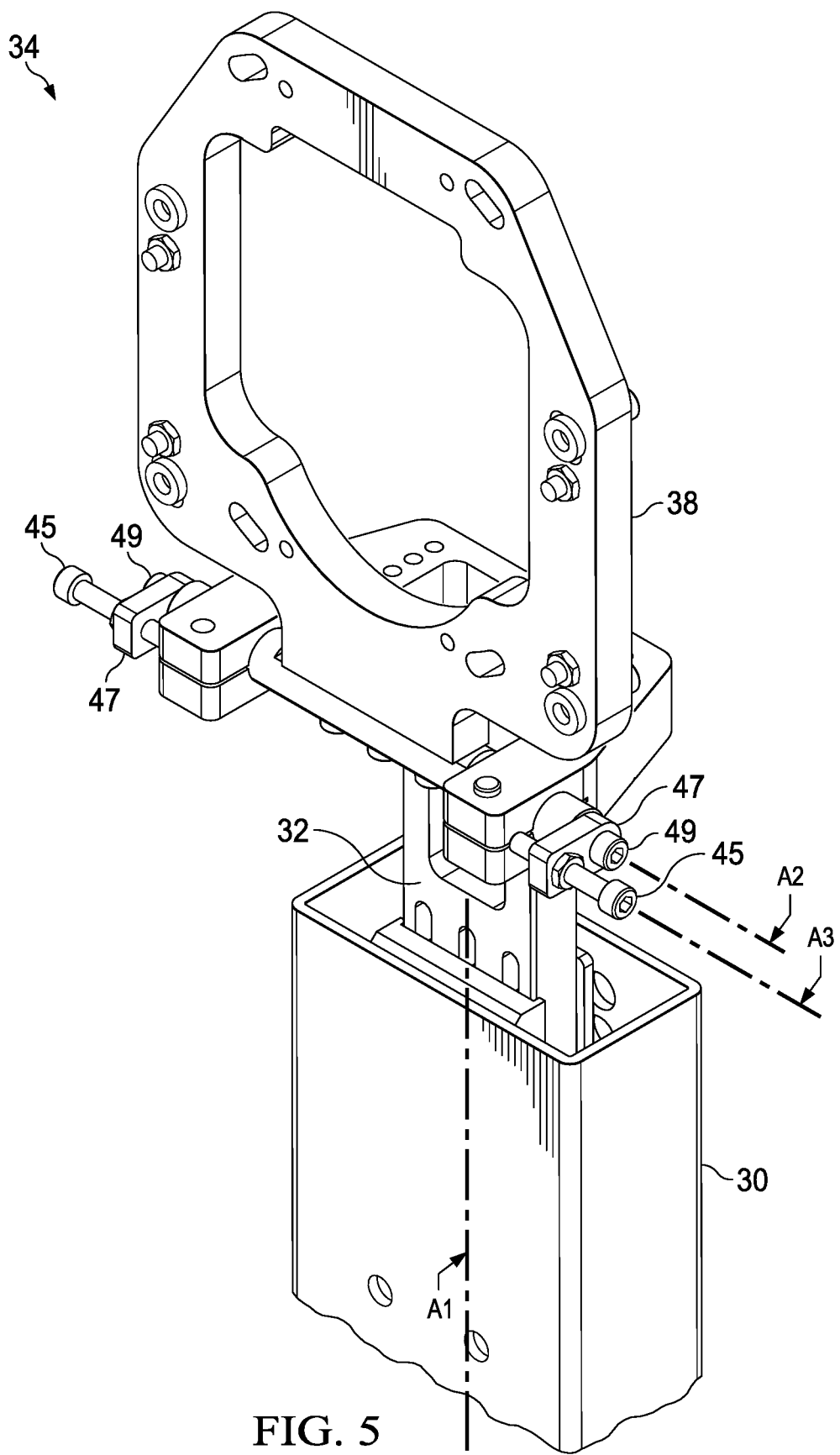
Figure 6:
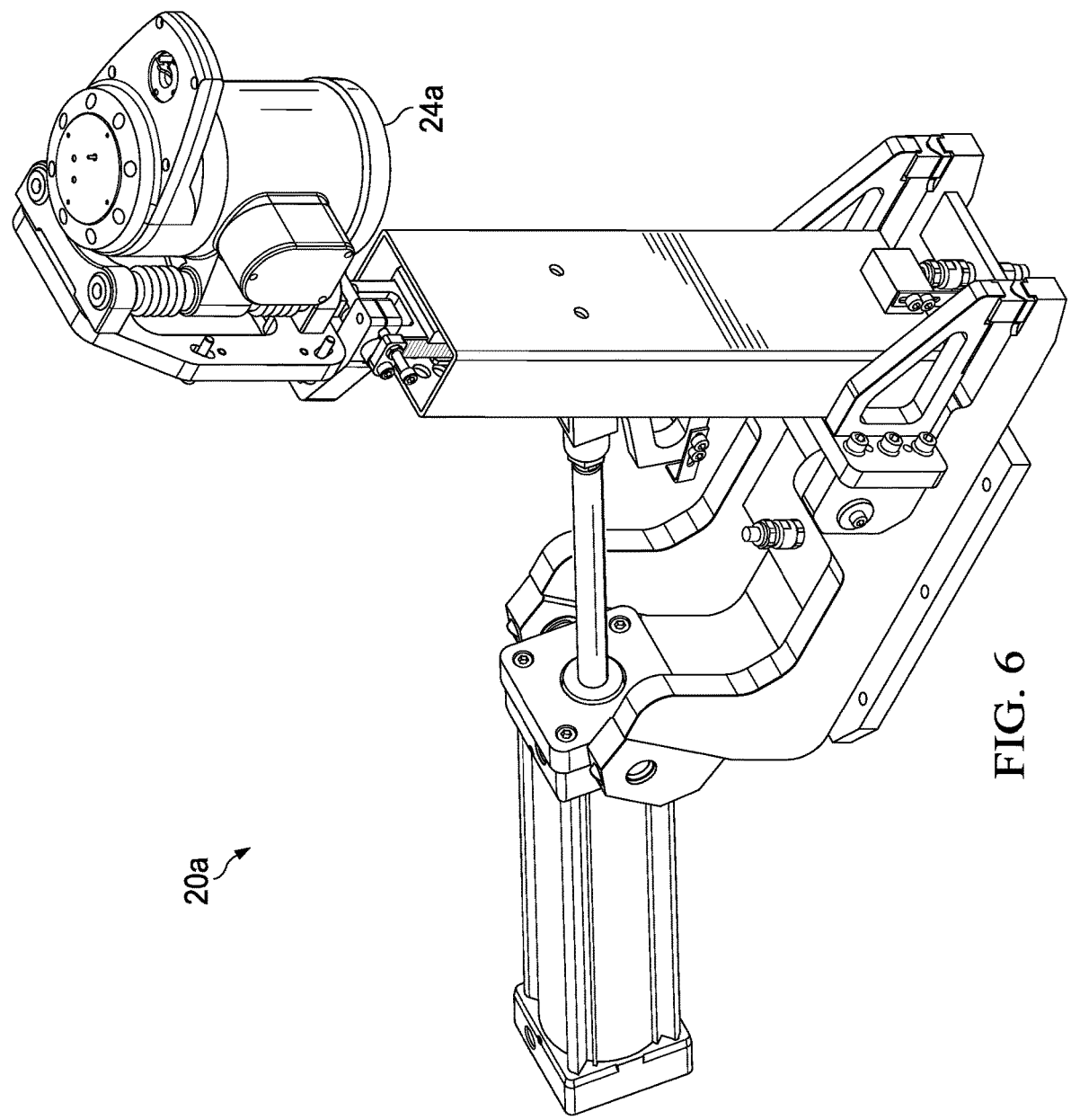
FIG. 6 is a perspective view depicting a swing arm assembly according to another embodiment.
Figure 7:
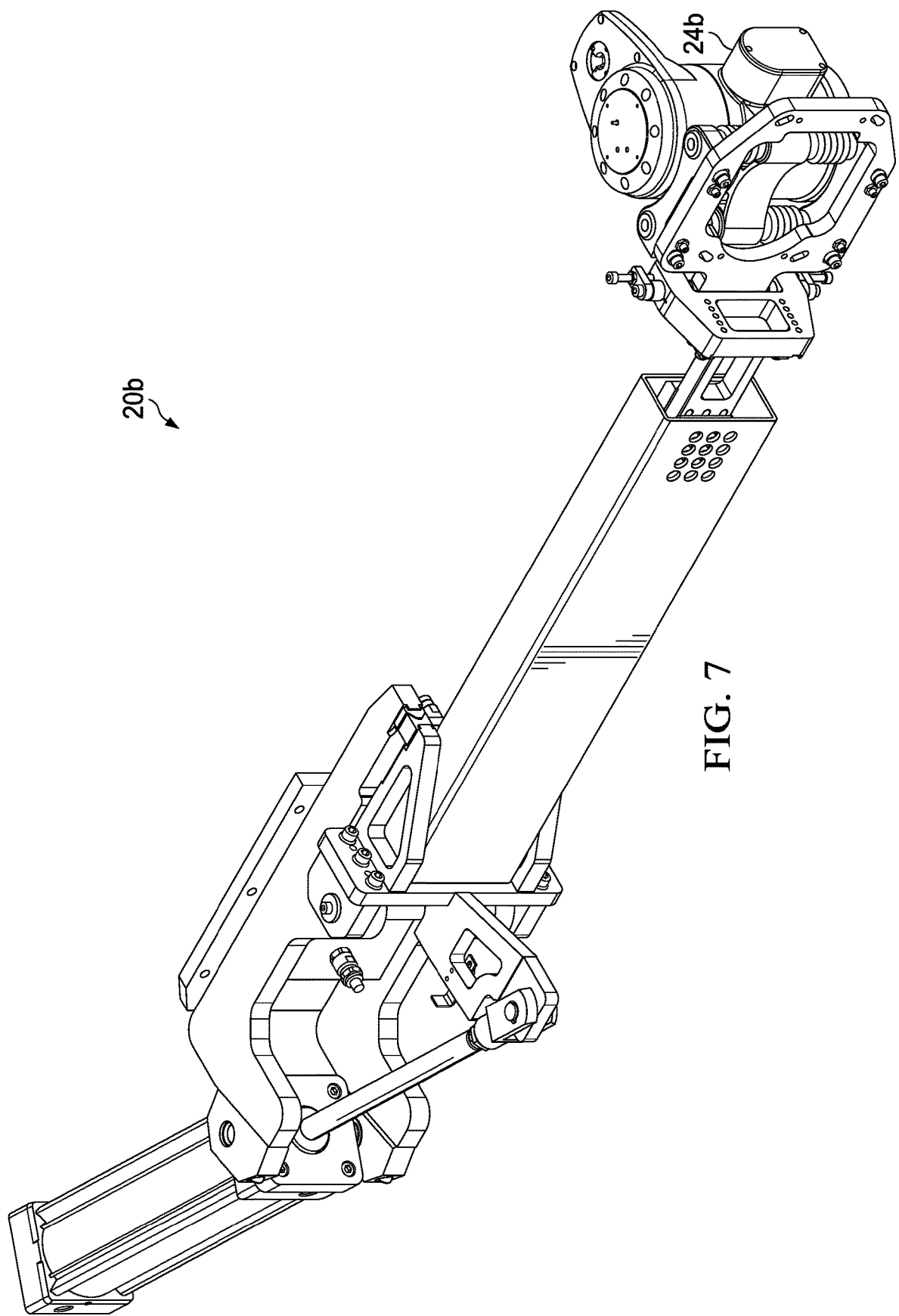
FIG. 7 is a perspective view depicting a swing arm assembly according to yet another embodiment.
Figure 8:
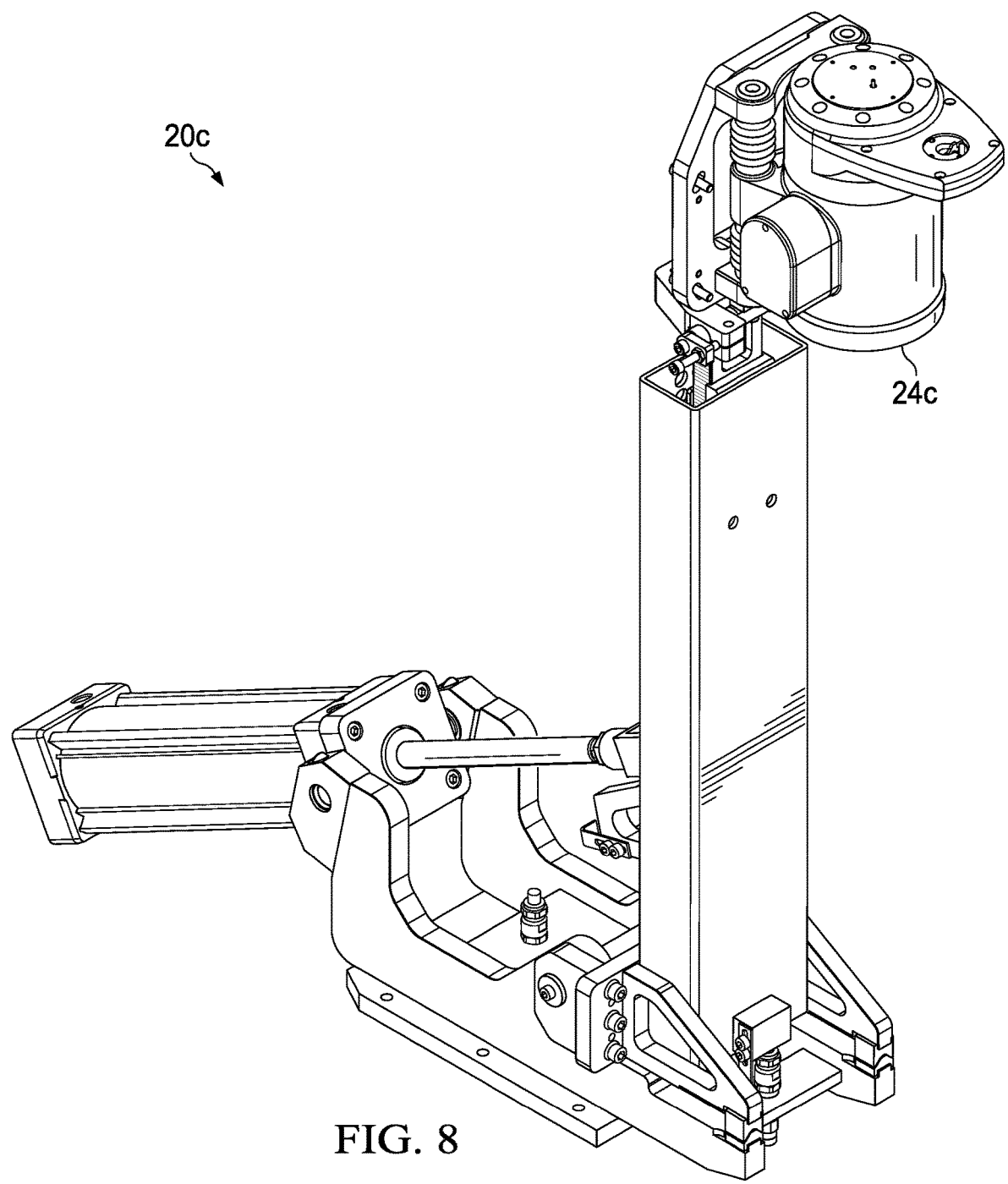
FIG. 8 is a perspective view depicting a swing arm assembly according to yet another embodiment.
Figure 9:
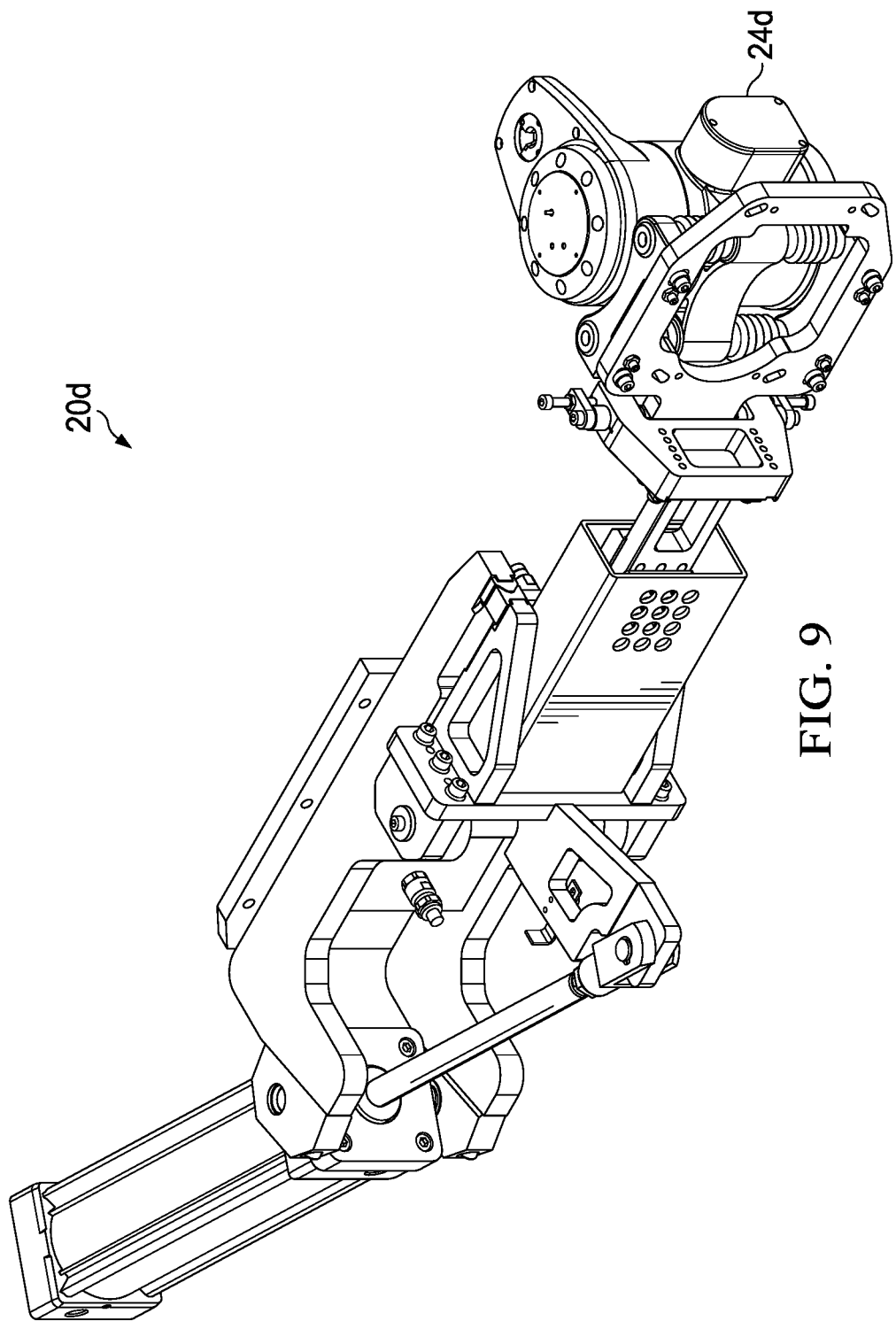
FIG. 9 is a perspective view depicting a swing arm assembly according to yet another embodiment.

Referring now to FIGS. 2-5, the head 34 can include a support plate 38 that is rotatably coupled with a support 40 by a rotational adjustment tube 42. The rotational adjustment tube 42 can include a plurality of fasteners 44 that allow for selective positioning of the support plate 38 with respect to the support 40. A pair of vertical adjustment bolts 45 can be associated with the support 40 and can facilitate vertical positioning of the support plate 38 with respect to the support 40. The support plate 38 can include a plurality of adjustment screws (e.g., 46) and adjustment jacking bolts (e.g., 48). As illustrated in FIGS. 3 and 4, the tip dresser 24 can be releasably attached to the support plate 38 by the adjustment screws (e.g., 46). The adjustment screws (e.g., 46) and adjustment jacking bolts (e.g., 48) can cooperate to permit fine tuning of the positioning of the tip dresser 24 upon the support plate 38. For example, as illustrated in FIGS. 3 and 4, the spacing of each side of the tip dresser 24 can be adjusted with the adjustment screws (e.g., 46). Referring again to FIG. 2, the adjustment screws (e.g., 46) can be provided through slotted holes 50 in the support plate 38 that allow for fine tuning of the rotational position of the tip dresser 24 during installation. It is to be appreciated that when the tip dresser 24 is attached to the head 34, the positioning of the tip dresser 24 can be adjusted to ensure proper interaction with the welding tips of the spot welder (e.g., by adjusting any of the plurality of fasteners 44, the pair of vertical adjustment bolts 45, the adjustment screws (e.g., 46) and the adjustment jacking bolts (e.g., 48)).

FIGS. 6-9 illustrate various alternative embodiments of swing arm assemblies (20a, 20b, 20c, and 20d, respectively) that are similar to the swing arm assembly 20 illustrated in FIGS. 1-5 except that the swing arm assemblies (20a, 20b, 20c, and 20d, respectively) have different arm lengths and the tip dressers (24a, 24b, 24c, and 24d, respectively) are provided in different orientations.

Figure 10:
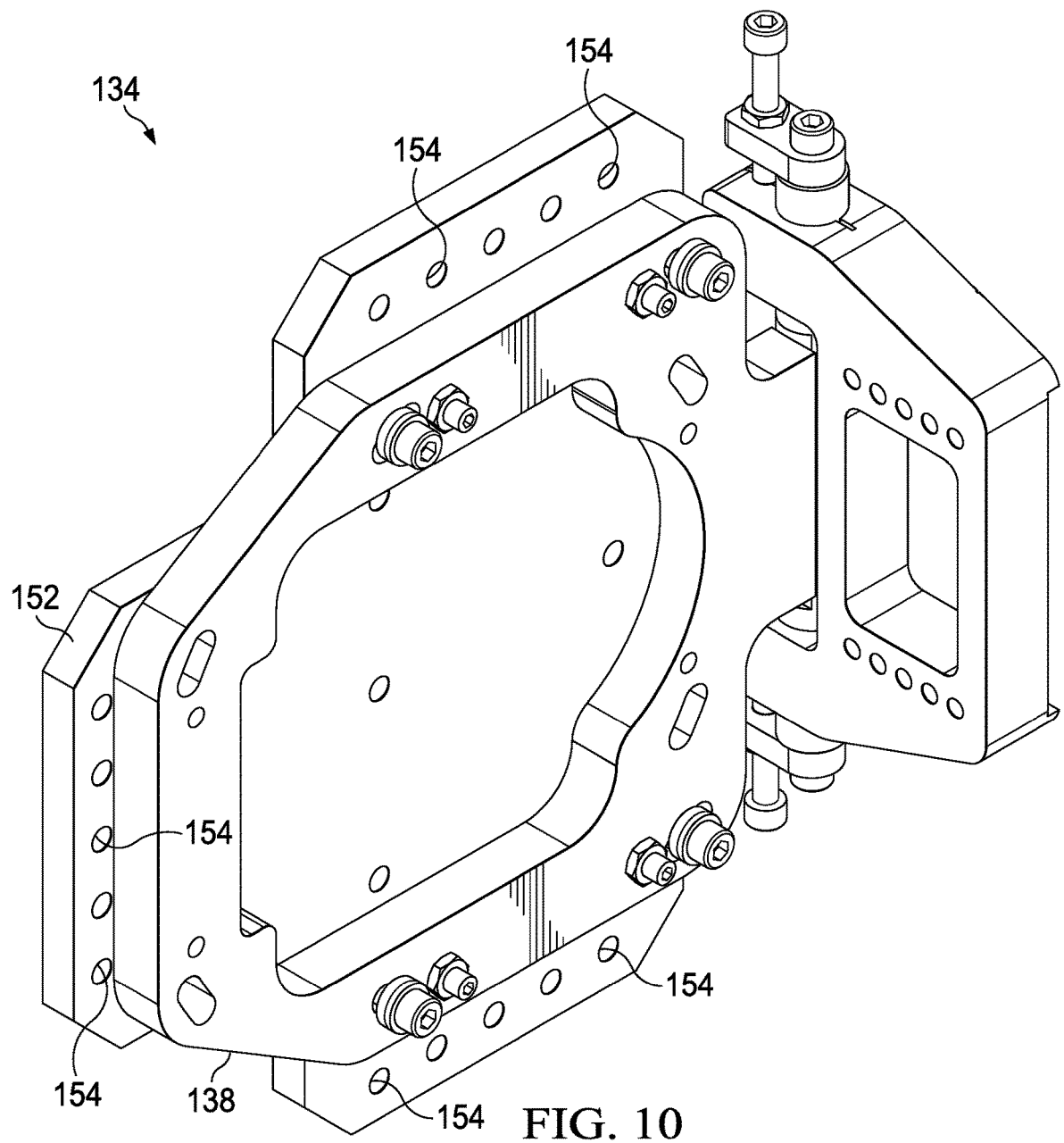
FIG. 10 is a perspective view depicting an alternative embodiment of a head of a swing arm.

FIG. 10 illustrates an alternative embodiment of a head 134 for a swing arm assembly, the head 134 being similar to, or the same as in many respects as, the head 34 illustrated in FIGS. 1-5. However, the head 134 can include an adapter plate 152 releasably secured to a support plate 138. The adapter plate 152 can include a plurality of holes 154 that can accommodate a variety of different tip dressers (not shown).

Figure 11:
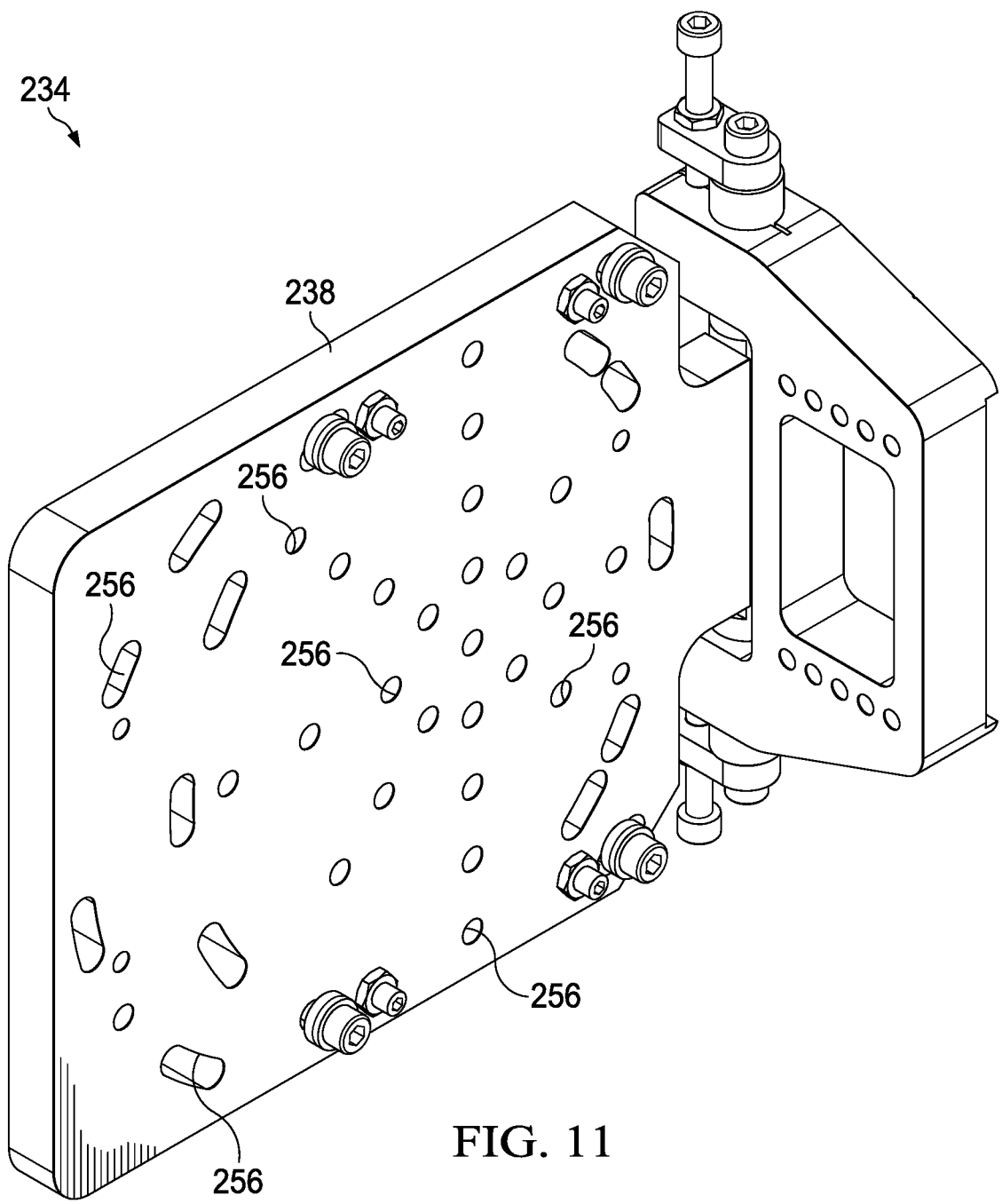
FIG. 11 is a perspective view depicting another alternative embodiment of a head of a swing arm.

FIG. 11 illustrates another alternative embodiment of a head 234 for a swing arm assembly, the head 234 being similar to, or the same as in many respects as, the head 34 illustrated in FIGS. 1-5. However, a support plate 238 of the head 234 can include a plurality of different holes 256 that are distributed along the support plate to accommodate a variety of different tip dressers (not shown).

Figure 12:
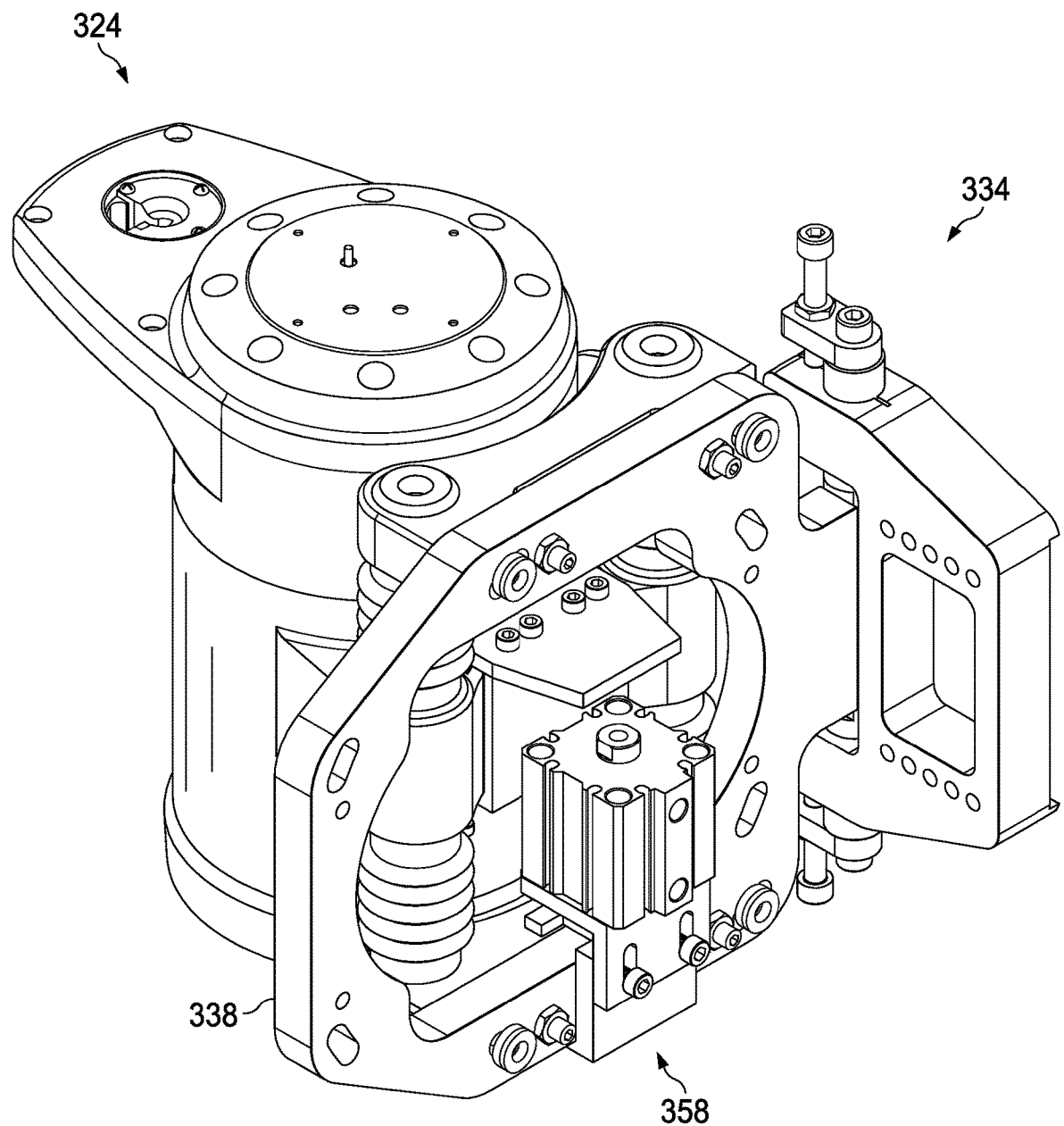
FIG. 12 is a perspective view depicting yet another alternative embodiment of a head of a swing arm.

FIG. 12 illustrates another alternative embodiment of a head 334 for a swing arm assembly, the head 334 being similar to, or the same as in many respects as, the head 34 illustrated in FIGS. 1-5. For example, a tip dresser 324 can be mounted to a support plate 338 of the head 334. However, a lift assembly 358 can be releasably secured to the support plate 338 and can be operably coupled with the tip dresser 324. The lift assembly 358 can be configured to facilitate powered vertical movement of the tip dresser 324 for effective positioning of the tip dresser 324 with respect to welding tips.

Figure 13:
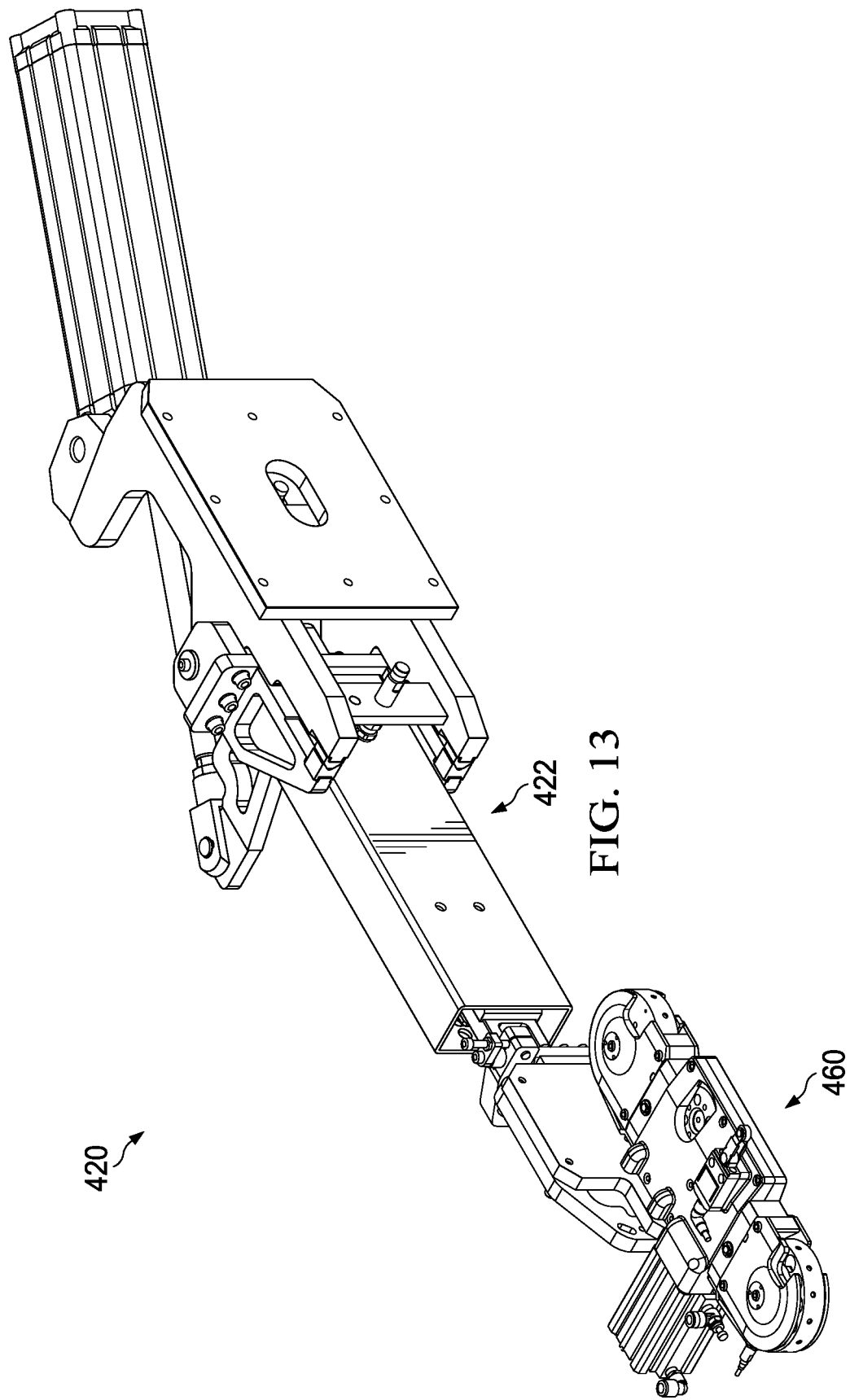
FIGS. 13-15 are various views depicting yet another alternative embodiment of a swing arm assembly.
Figure 14:
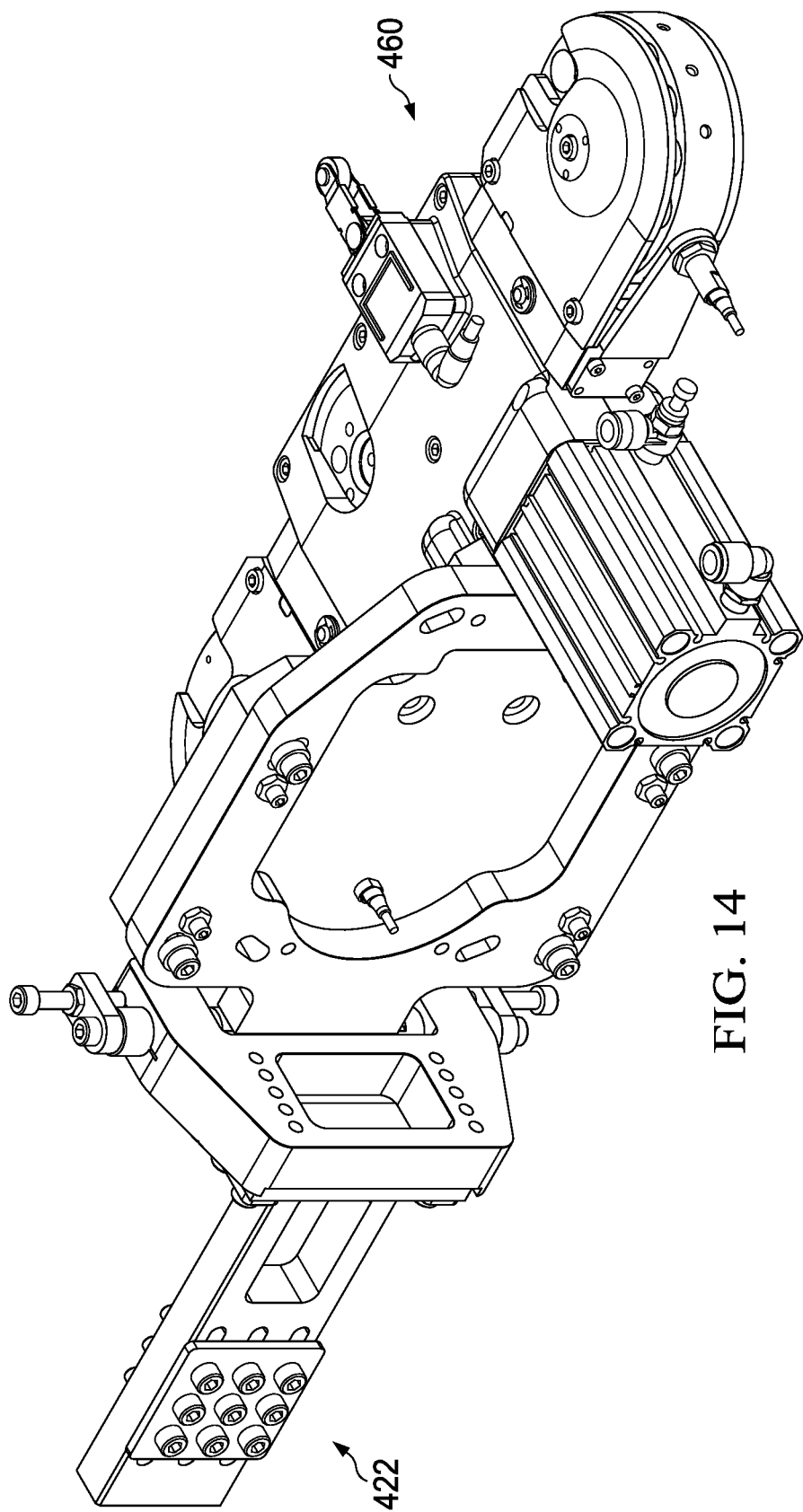
Figure 15:
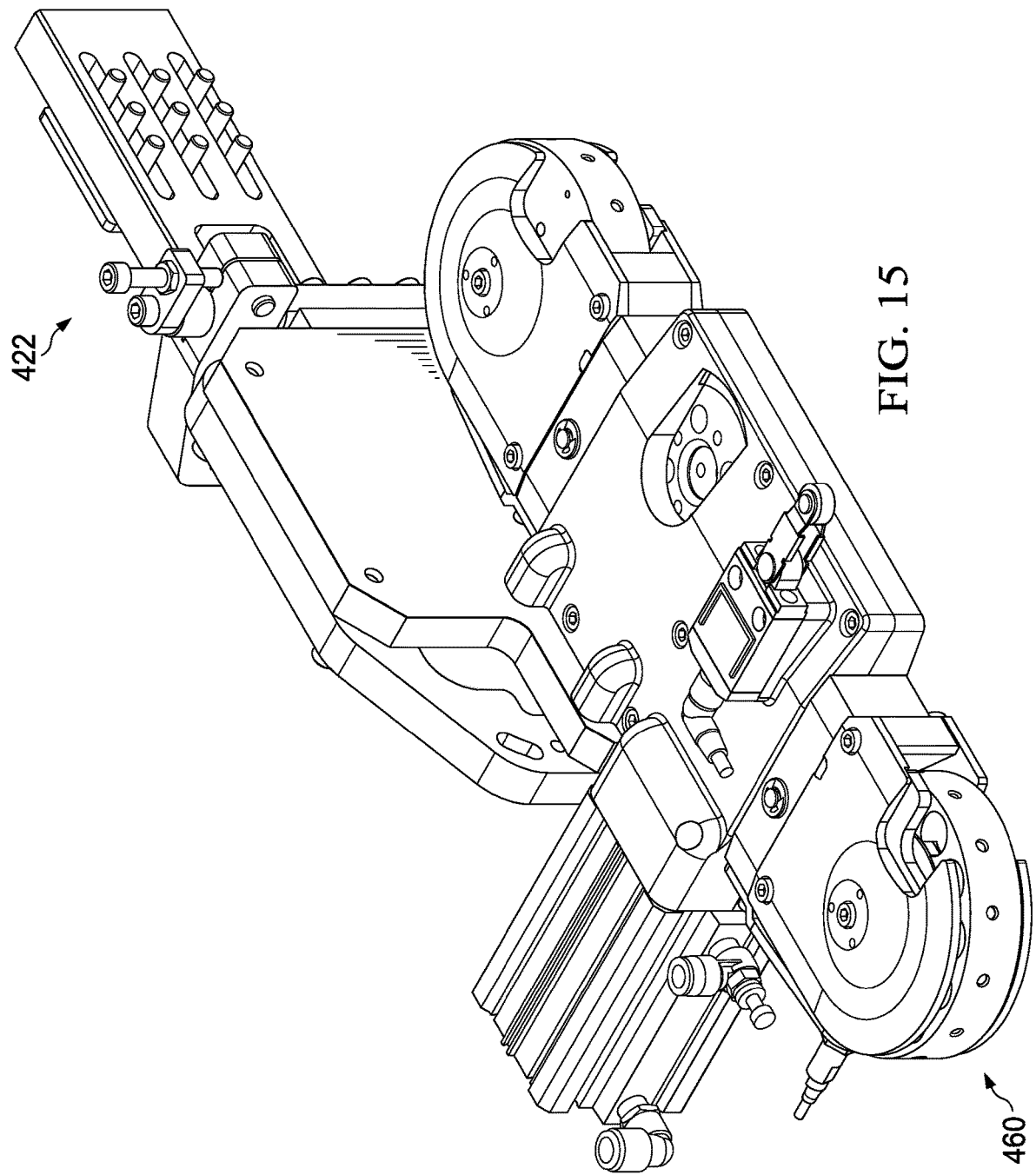

FIGS. 13-15 illustrate yet another alternative embodiment of a swing arm assembly 420 that is similar to, or the same as in many respects as, the swing arm assembly 20 illustrated in FIGS. 1-5. For example, the swing arm assembly 420 can include a swing arm 422. However, the swing arm assembly 420 can include a tip exchanger 460 that is configured to facilitate replacement of tips of a spot welding machine.

Figure 16:
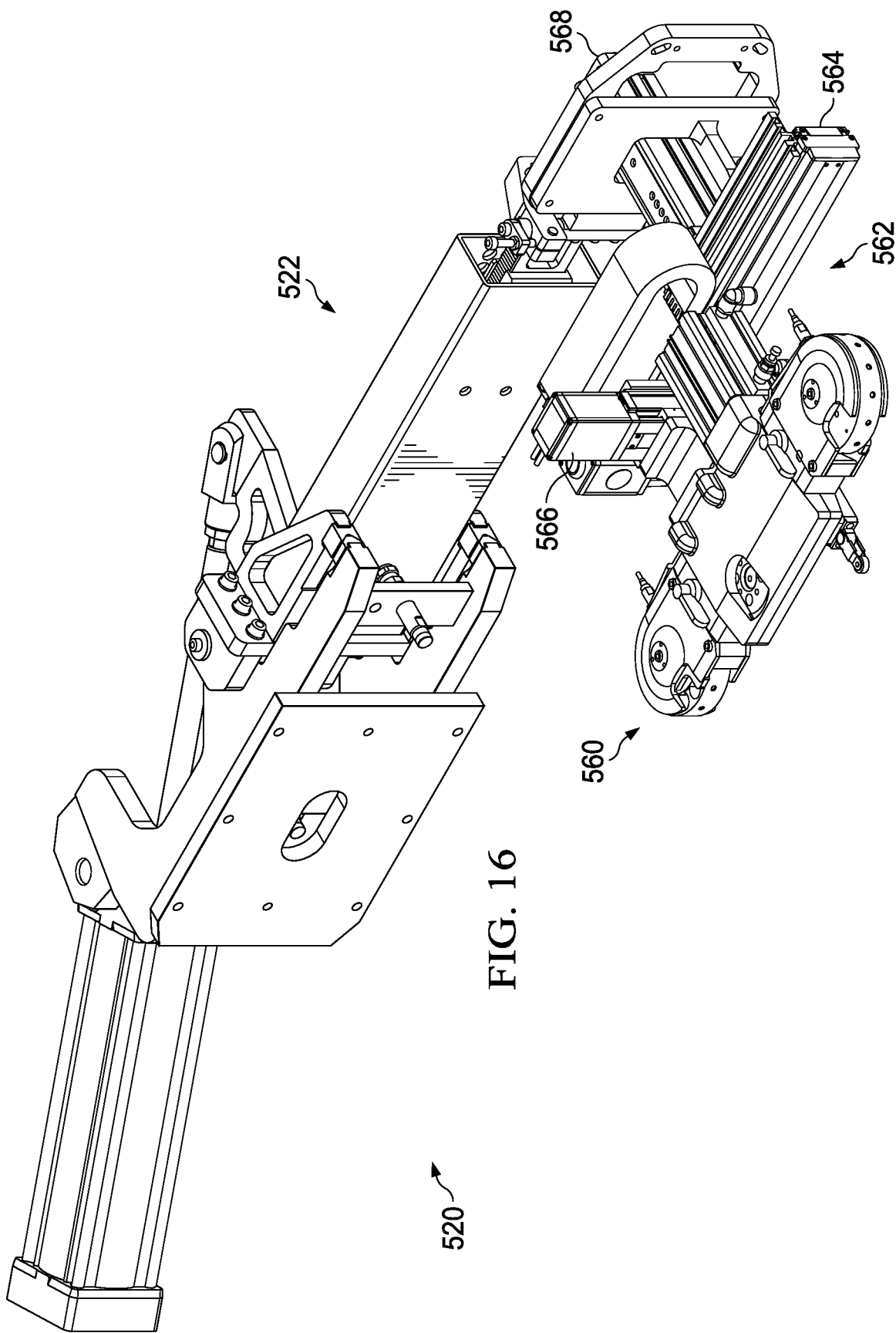
FIGS. 16-19 are various views depicting yet another alternative embodiment of a swing arm assembly.
Figure 17:
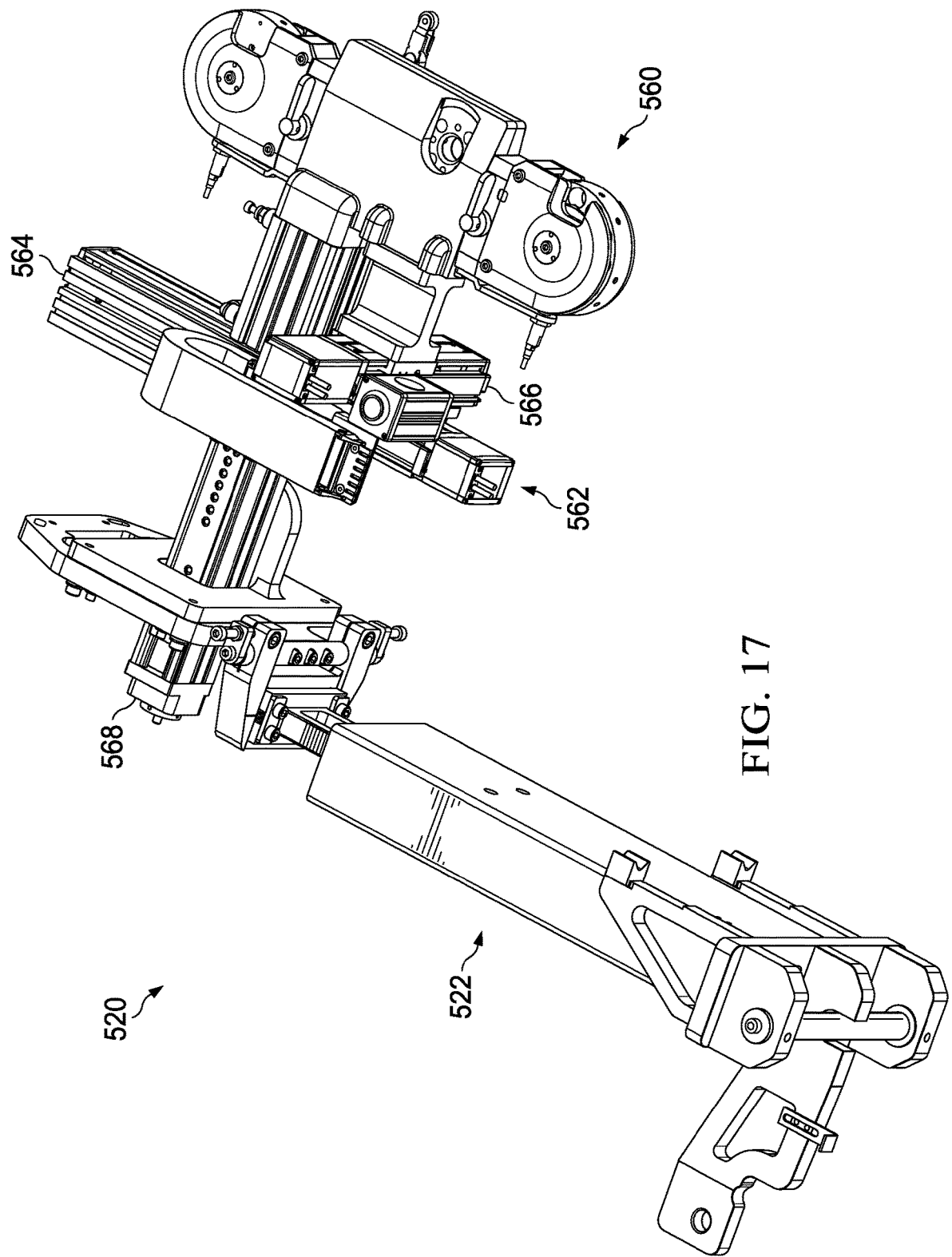
Figure 18:
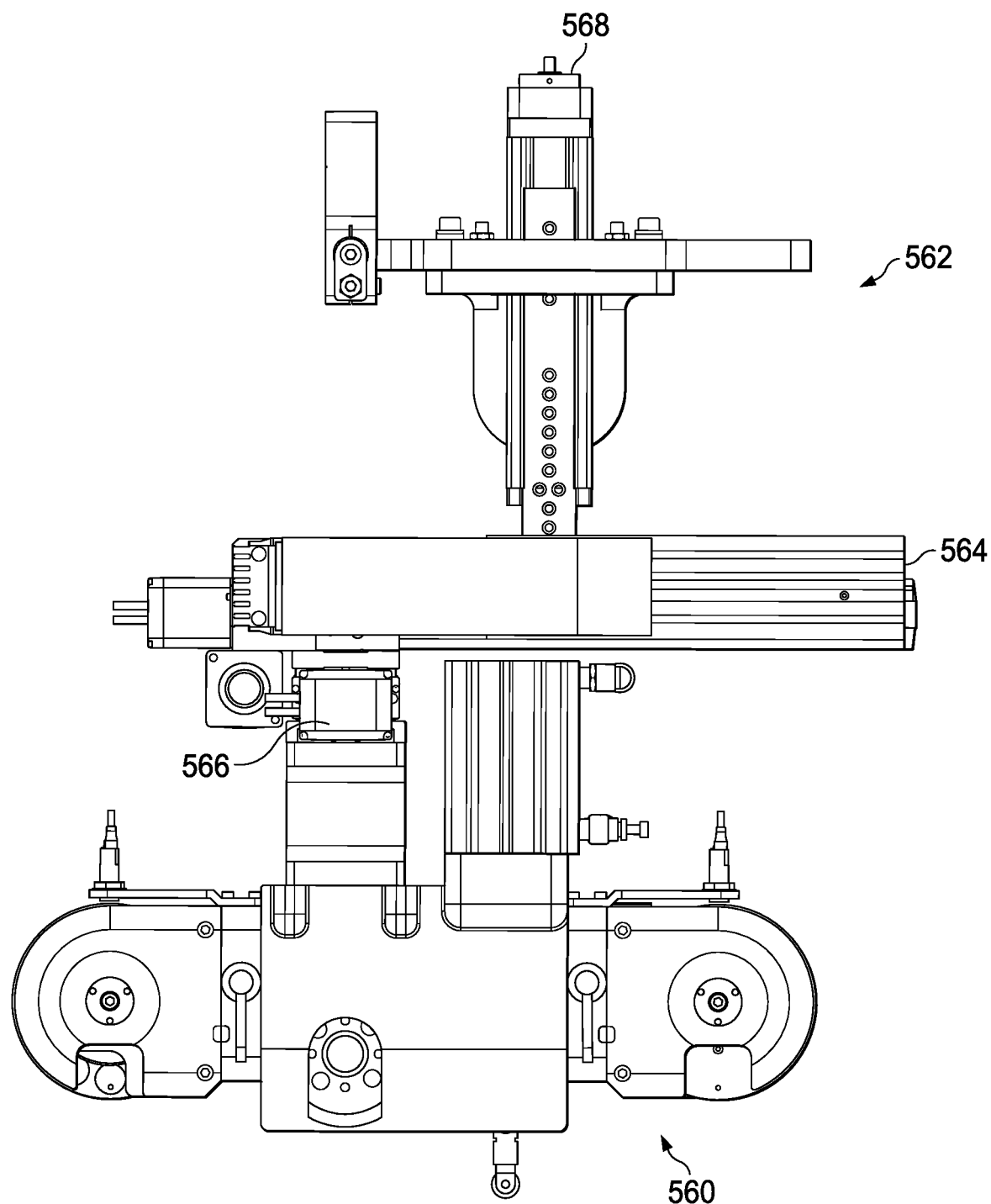
Figure 19:
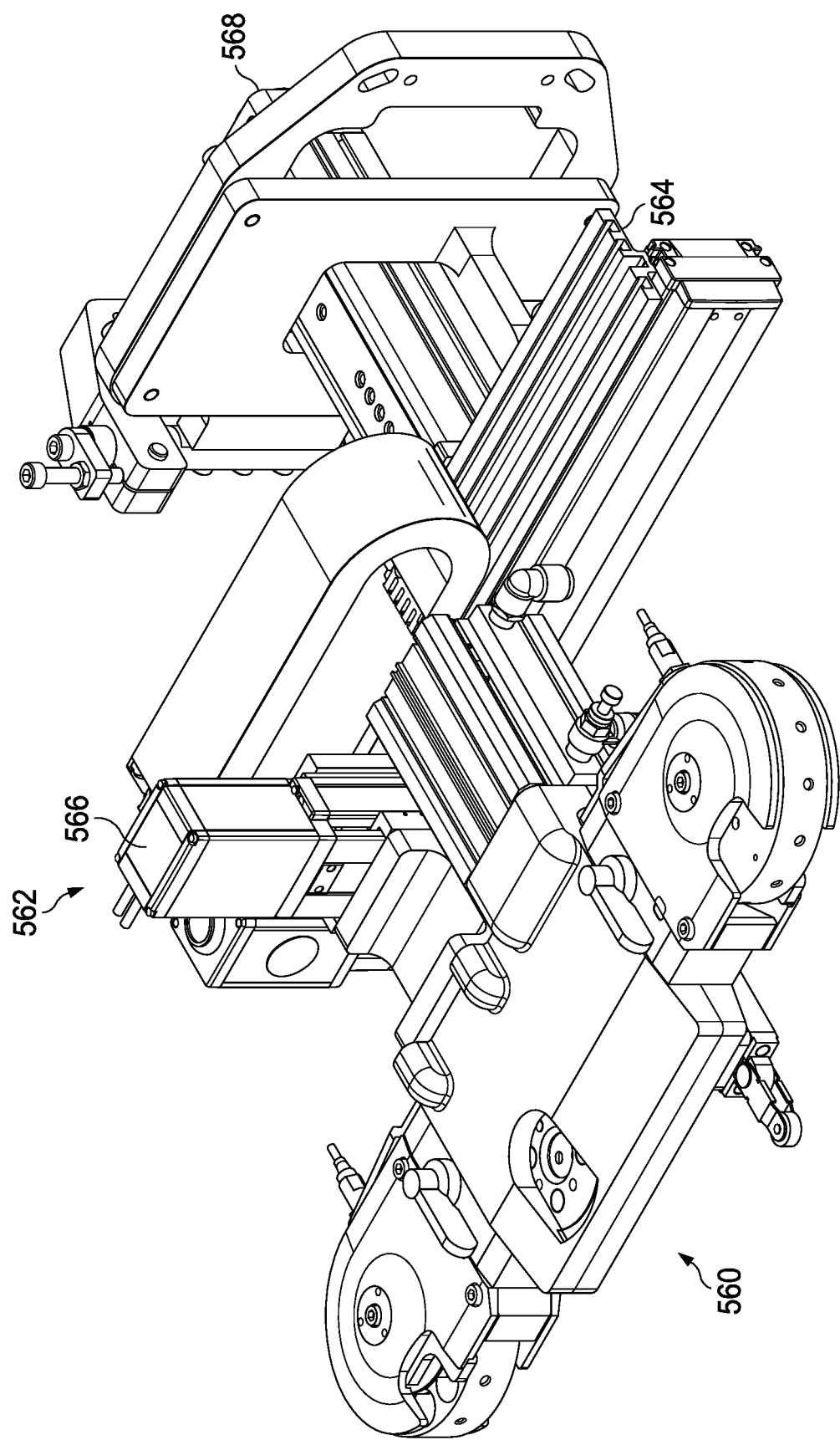

FIGS. 16-19 illustrate yet another alternative embodiment of a swing arm assembly 520 that is similar to, or the same as in many respects as, the swing arm assembly 20 illustrated in FIGS. 1-5. For example, as illustrated in FIGS. 16 and 17, the swing arm assembly 520 can include a swing arm 522. However, the swing arm assembly 520 can include a tip exchanger 560 that is configured to facilitate replacement of tips of a spot welding machine. The swing arm assembly 520 can also include an XYZ servo positioning system 562 (FIG. 18) that includes an X-axis servo slide 564, a Y-axis servo slide 566, and a Z-axis servo slide 568 that cooperate to facilitate three-dimensional positioning of the tip exchanger 560 with respect to a spot welding machine (not shown). It is to be appreciated that the XYZ servo positioning system 562 can be powered pneumatically, hydraulically, electrically, or with any of a variety of suitable additional or alternative motive sources.

Figure 20:
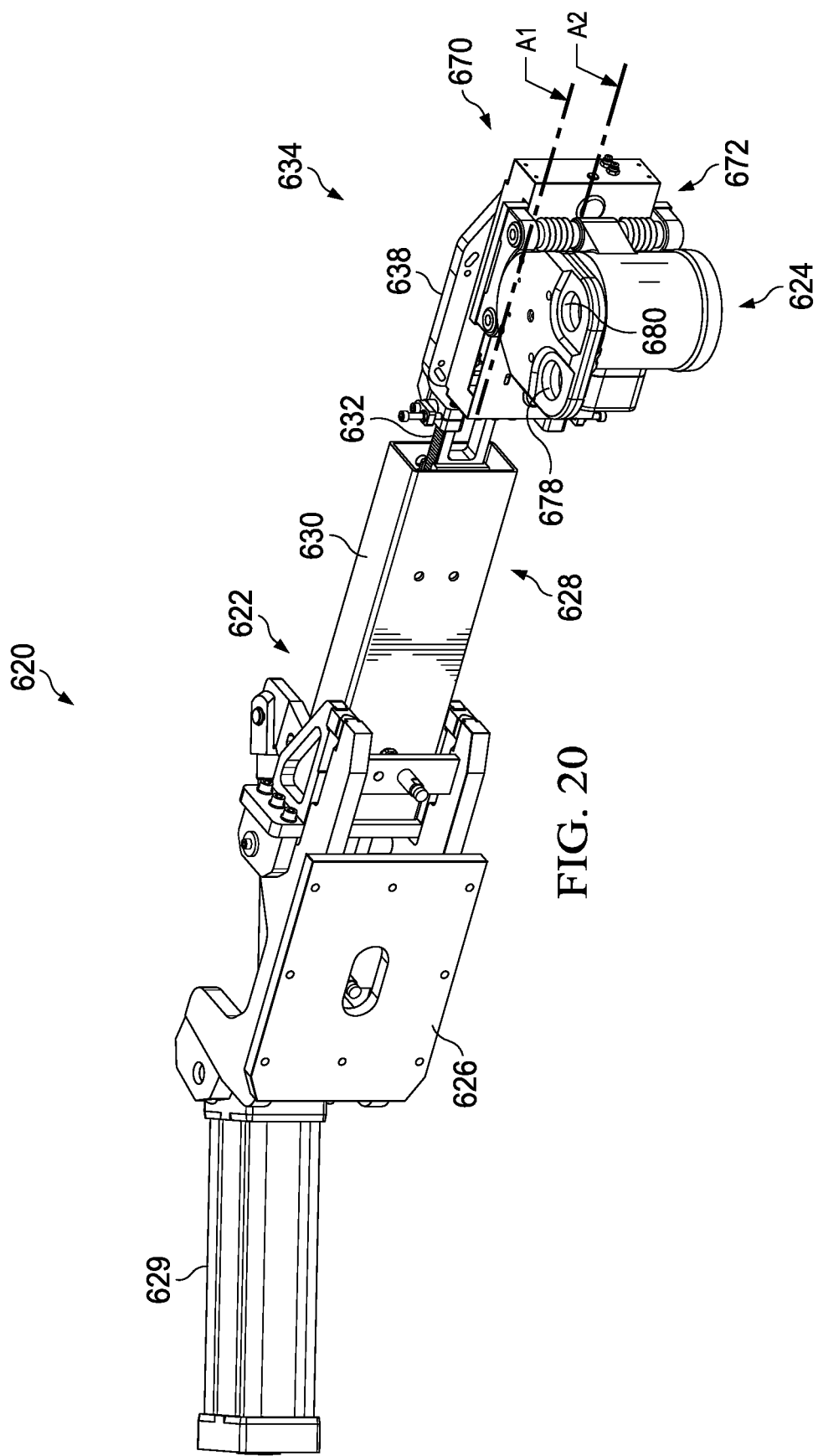
FIGS. 20-25 are various views depicting a swing arm assembly having a shifter according to one embodiment.
Figure 21:
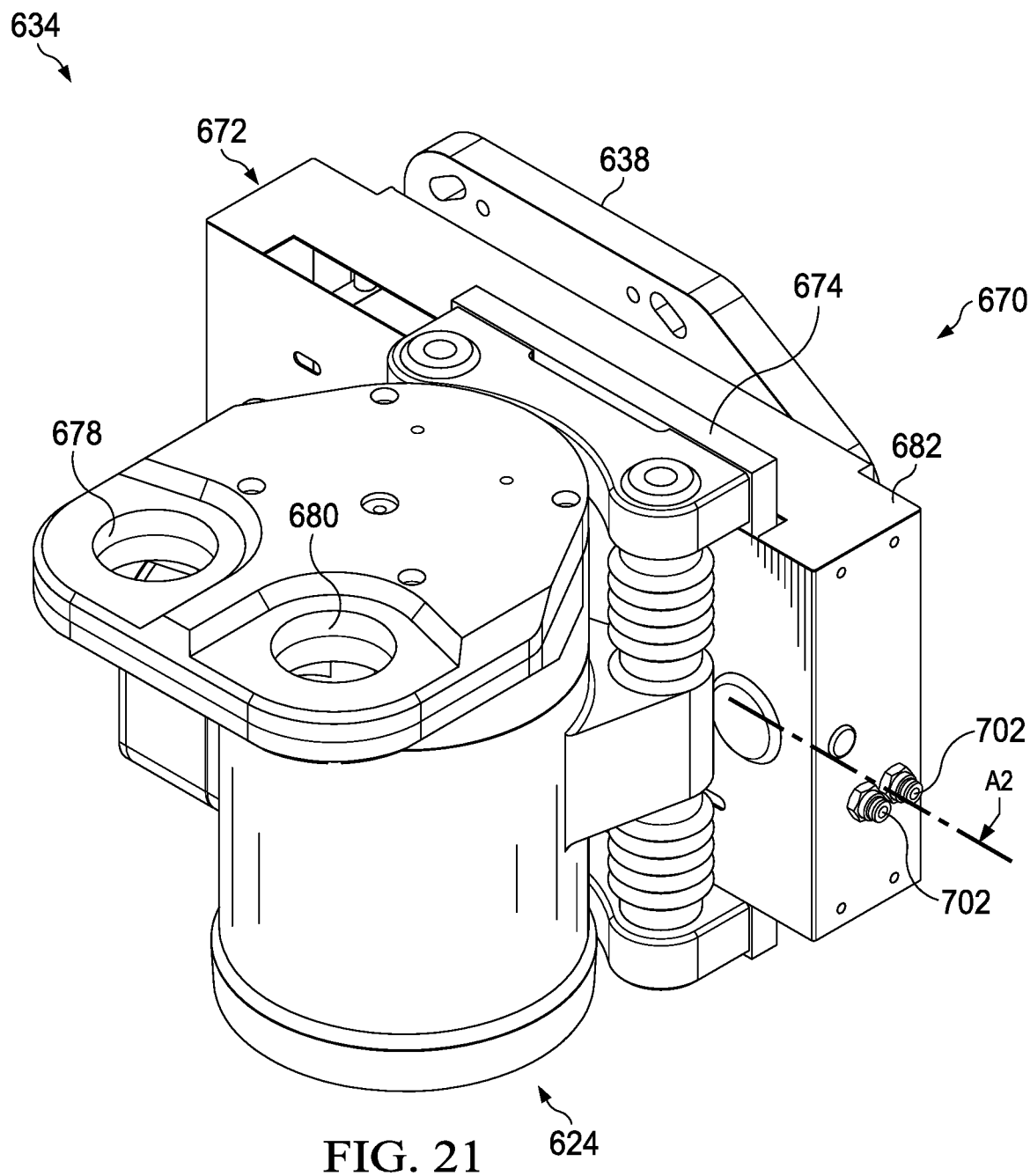

Embodiments of a swing arm system having a slider or shifter are hereinafter described in detail in connection with the views and examples of FIGS. 20-25. As illustrated in FIGS. 20 and 21, a swing arm assembly 620 is provided that can include a swing arm 622 and a tip dresser 624. The swing arm 622 can selectively position the tip dresser 624 with respect to welding tips of a spot welder (not shown) to facilitate cleaning/dressing of the welding tips. The swing arm 622 can include a mounting base 626, an arm assembly 628 coupled to the mounting base 626, and a driver cylinder 629 pivotally coupled to the mounting base 626. The driver cylinder 629 can be operably mounted to the arm assembly 628 to facilitate pivoting of the arm assembly 628 with respect to the mounting base 626. In one embodiment, the driver cylinder 629 can be a pneumatic drive. In other embodiments, any of a variety of drives can be used to facilitate powered pivoting of the arm assembly 628, such as, for example, a servo. The arm assembly 628 can include an arm 630, an extendible arm mount 632, and a head 634. The extendible arm mount 632 can be slidably coupled with the arm 630 and slidable along an axis A1 between a retracted position and an extended position. The head 634 can be mounted to the extendable arm mount 632 and can be configured to accommodate the tip dresser 624. The extendible arm mount 632 can be selectively extendible between the retracted position and the extended position to facilitate positioning of the tip dresser 624 with respect to welding tip. In one embodiment, the extendible arm mount 632 can be positioned during initial setup of the swing arm 622 to allow for repeated interaction with different welding tips without requiring repositioning of the extendible arm mount 632.

The mounting base 626 can facilitate mounting of the swing arm assembly 620 with fasteners (e.g., with bolts), to a floor, or at any of a variety of other suitable locations that allow the tip dresser 624 to interact properly with the spot welding machine (not shown). For example, when the spot welding machine is operating, the swing arm 622 can be in a stand-by position, such that the tip dresser 624 remains out of the operational zone of the spot welding machine. Once the welding tips are ready for dressing, the spot welding machine can cease spot welding, and the swing arm 622 can pivot the tip dresser 624 into position (via operation of the driver cylinder 629 and/or sliding of the extendible arm mount 632). The spot welding machine can then bring the welding tips into contact with a cleaning mechanism (not shown) on the tip dresser 624 to facilitate dressing of the welding tips. In one embodiment, the swing arm 622 can move the tip dresser 624 into place without requiring substantial movement of the spot welder. In another embodiment, the swing arm 622 and the spot welding machine can move together such that they meet at a predetermined location.

Figure 22:
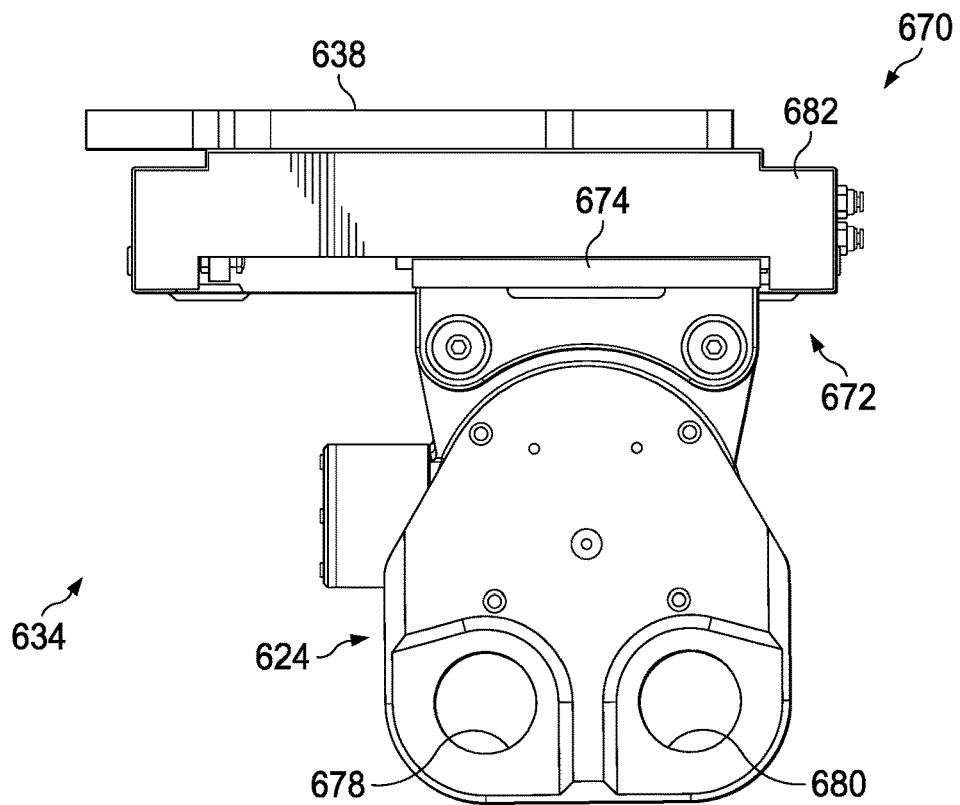
Figure 23:
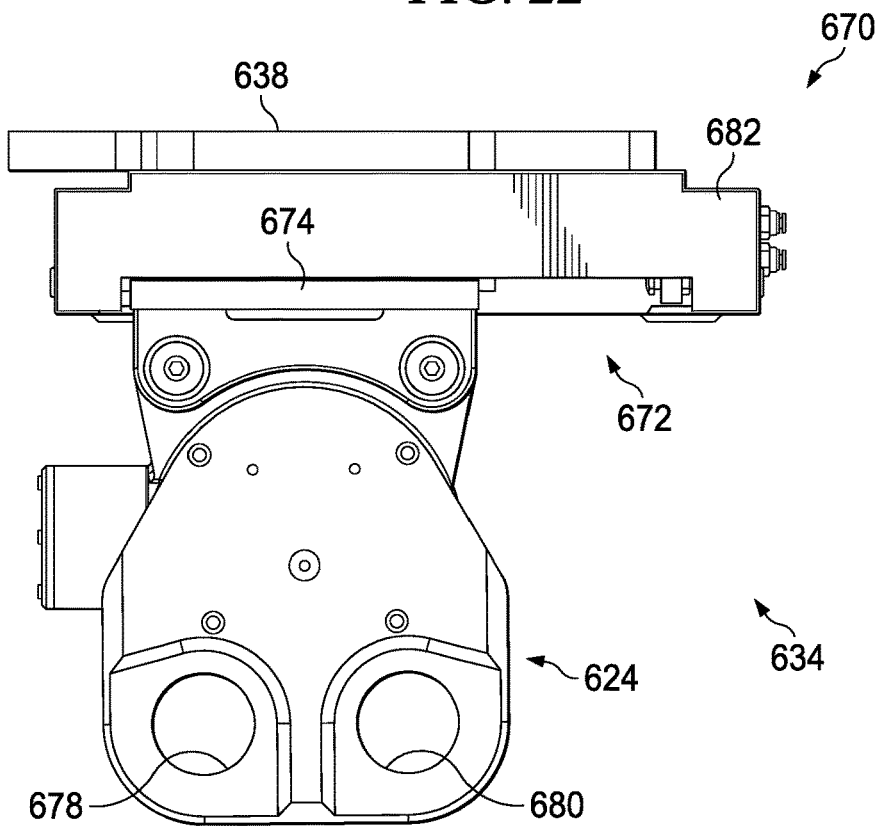

The head 634 of the swing arm assembly 620 can include a support plate 638 that can be coupled with the rest of the head 634 with fasteners (not shown) or other suitable alternative securement arrangements. Referring now to FIGS. 22 and 23, the support plate 638 can include a plurality of attachment features that can facilitate the attachment of a shifter 670. The shifter 670 can include a body 672 and a slide plate 674. The tip dresser 624 can be releasably coupled to the slide plate 674 with fasteners (not shown) that can interact with holes 676 (FIGS. 24 and 25) defined by the slide plate 674. It is to be appreciated that the tip dresser 624 can be coupled with the slide plate 674 through any of a variety of suitable methods, such as through welding, for example.

The slide plate 674 can be slidable with respect to the body 672 along an axis A2 between a first position (FIGS. 20-22) and a second position (FIG. 23). In one embodiment, the axis A2 can be substantially parallel with the axis A1. When in the first position, the slide plate 674 can be laterally translated to a position proximate a distal end of the shifter 670. When in the second position, the slide plate 674 can be laterally translated to a position proximate a proximal end of the shifter 670. Although the slide plate 674 is shown to travel along a single axis (e.g., A2) it will be appreciated that it the slide plate 674 can alternatively be configured to move along multiple axes.

The slide plate 674 can be moved between the first and second positions to facilitate lateral movement of the tip dresser 624 relative to a weld tip. As illustrated in FIGS. 20-23, the tip dresser 624 can be a dual tip dresser that has a first cutting area 678 adjacent to a second cutting area 680. The first cutting area 678 can have dull cutting blades and the second cutting area 680 can have sharp cutting blades. Movement of the slide plate 674 between the first position and the second position can facilitate interaction of either the first cutting area 678 or the second cutting area 680 with a weld tip when the tip dresser 624 is moved into position (e.g., by the swing arm 622) to dress the weld tip. For example, the swing arm assembly 620 can swing the tip dresser 624 into interaction with a weld tip with the tip dresser 624 in the first position, such that the first cutting area 678 interacts with the weld tip. Once the weld tip has been treated by the first cutting area 678, the swing arm 622 and/or the slide plate 674 can facilitate movement of the slide plate 674 to the second position such that the second cutting area 680 interacts with the weld tip. In one embodiment, the swing arm 622 and/or the slide plate 674 can facilitate movement of the slide plate 674 directly from the first position to the second position. In another embodiment, when the slide plate 674 is in the first position and the treatment of the weld tip in the first cutting area 678 is complete, the swing arm 622 can then move the tip dresser 624 enough to remove the weld tip from the first cutting area 678. The slide plate 674 can then be moved to the second position, and the swing arm 622 can then swing the tip dresser 624 into interaction with the weld tip to locate the weld tip in the second cutting area 680 for subsequent treatment thereof.

In some embodiments, the weld tip might only need to interact with one of the first and second cutting areas 678, 680. Selection from between the first and second cutting areas 678, 680 can depend on a variety of factors, such as, for example, the cutting requirement for the tips, the amount of buildup on the tip, the tip material used (e.g., aluminum or copper), and/or any interference issues between the weld tips and the tip dresser 624 during the motion path. It will be appreciated that any suitable position of the slide plate 674 among the first and second positions is contemplated, where such movement may help avoid interference with weld tips or allow for precise positioning of the first and second cutting areas 678, 680.

Figure 24:
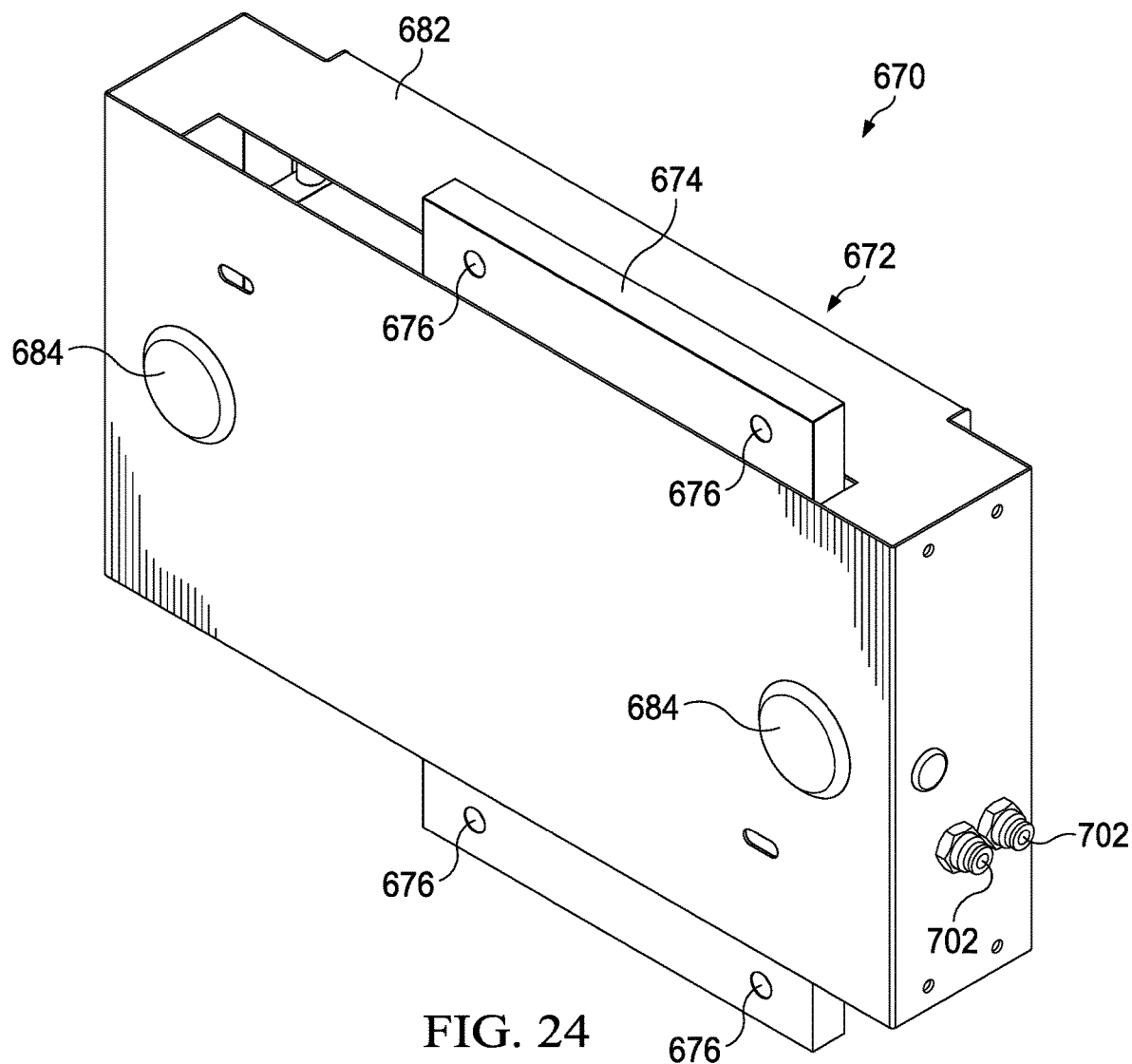
Figure 25:
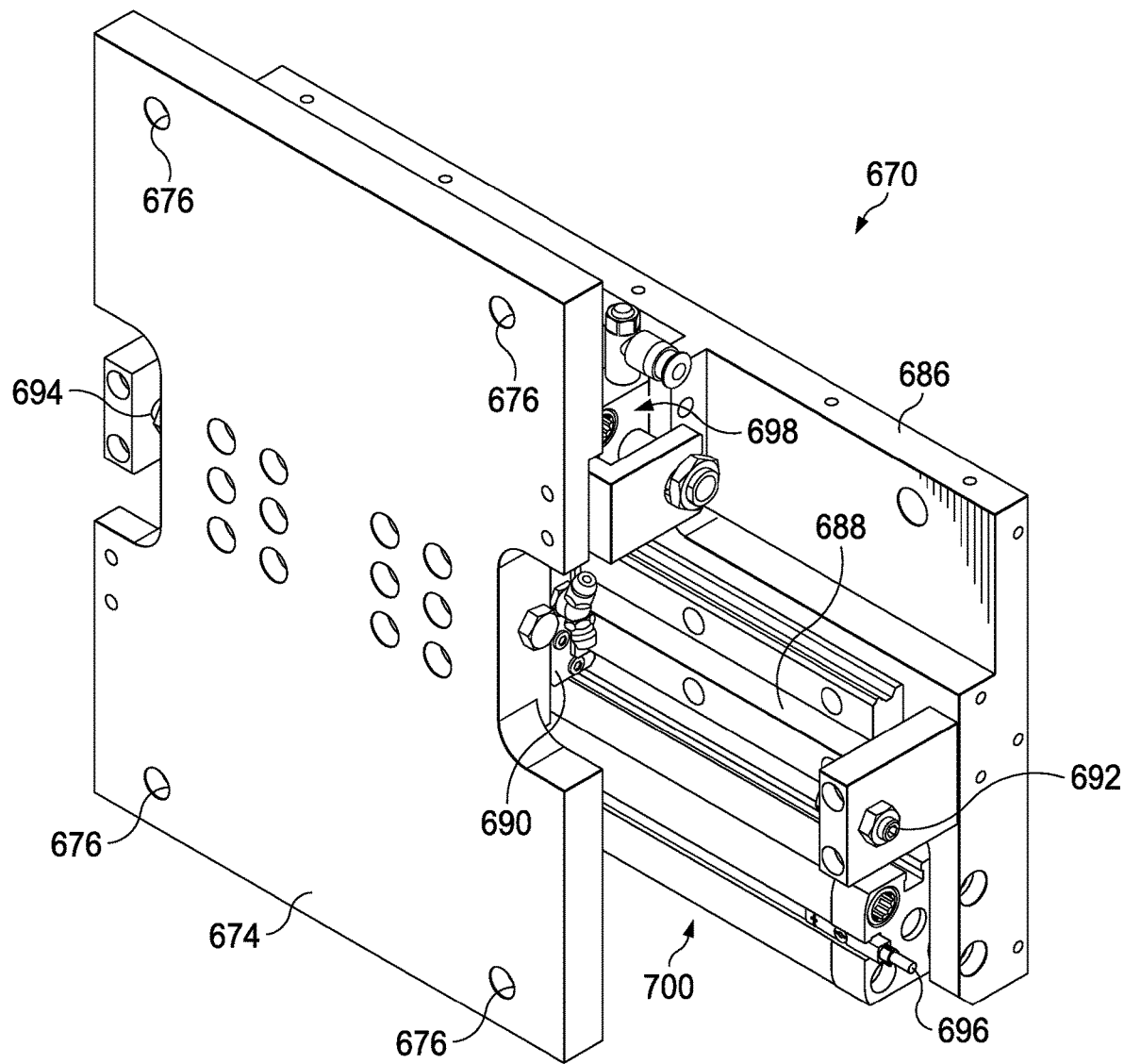

Referring to FIG. 24, the body 672 can include a shell 682 that can be selectively removable to reveal various internal components. A plurality of plugs 684 can be selectively inserted into the shell 682. Referring to FIG. 25, one embodiment of the shifter 670 is shown with the shell 682 removed. The shifter 670 can include a base plate 686 upon which a linear guide rail 688 can be mounted. A linear guide carriage 690 can be coupled with the slide plate 674 and can be received in the linear guide rail 688. The linear guide carriage 690 can interact with the linear guide rail 688 to facilitate sliding of the slide plate 674 between the first and second positions. In one embodiment, the base plate 686 and the linear guide rail 688 can be formed together in a unitary one-piece construction and the linear guide carriage 690 and the slide plate 674 can be formed together in a unitary one-piece construction. In other embodiments, the base plate and the slide plate 674 can include any of a variety of suitable alternative or additional features that facilitate sliding of the slide plate 674 between the first and second positions.

Adjustable position stoppers 692, 694 can be provided at each end of the linear guide rail 688 to prevent the linear guide carriage 690 from travelling beyond the linear guide rail 688. The adjustable position stoppers 692, 694 define the travel distance for the linear guide carriage 690 and thus the slide plate 674. In one embodiment, the adjustable position stoppers 692, 694 can be selectively adjusted (e.g., manually, remotely, and/or automatically) to define different travel distances (e.g., for different applications). It is to be appreciated that the slide plate 674 can be positioned relative to the base plate 686 in any of a variety of suitable alternative arrangements in addition to or in lieu of the adjustable position stoppers 692, 694. For example, the slide plate 674 can be positioned relative to the base plate 686 by an electrical servo or other powered positioning device in lieu of the adjustable position stoppers 692, 694.

A position sensor 696 can detect the position of the linear guide carriage 690 (and thus the slide plate 674) along the linear guide rail 688 and can communicate the position to a controller (not shown) to facilitate automated positioning of the slide plate 674 and associated tip dresser (e.g., 624). The controller can be a programmable logic controller (PLC) or any of a variety of other suitable additional or alternative controller. The controller can be associated with pre-programmed specifications, programs, and/or modes to facilitate changes between operational needs.

Still referring to FIG. 25, the shifter 670 can include a first pneumatic cylinder 698 and a second pneumatic cylinder 700 that is operably coupled with the slide plate 674 and configured to slide the slide plate 674 towards the first position and the second position, respectively. The first and second pneumatic cylinders 698, 700 can be fluidly coupled with one of a pair of pneumatic fittings 702 and powered by a fluid source (not shown), such as a source of compressed air, for example, that is coupled with the pneumatic fittings 702. Although a compact two-cylinder design is illustrated, other pneumatic cylinder designs and suitable number of cylinders are contemplated, such as a single cylinder design. It will be appreciated that the slide plate 674 can be actuated with any of a variety of suitable alternative power sources, such as electrically, for example. It is also to be appreciated that the shifter 670 can be any suitable shape or configuration, although a relatively flat box-shaped configuration may be beneficial to avoid interference.

Figure 26:
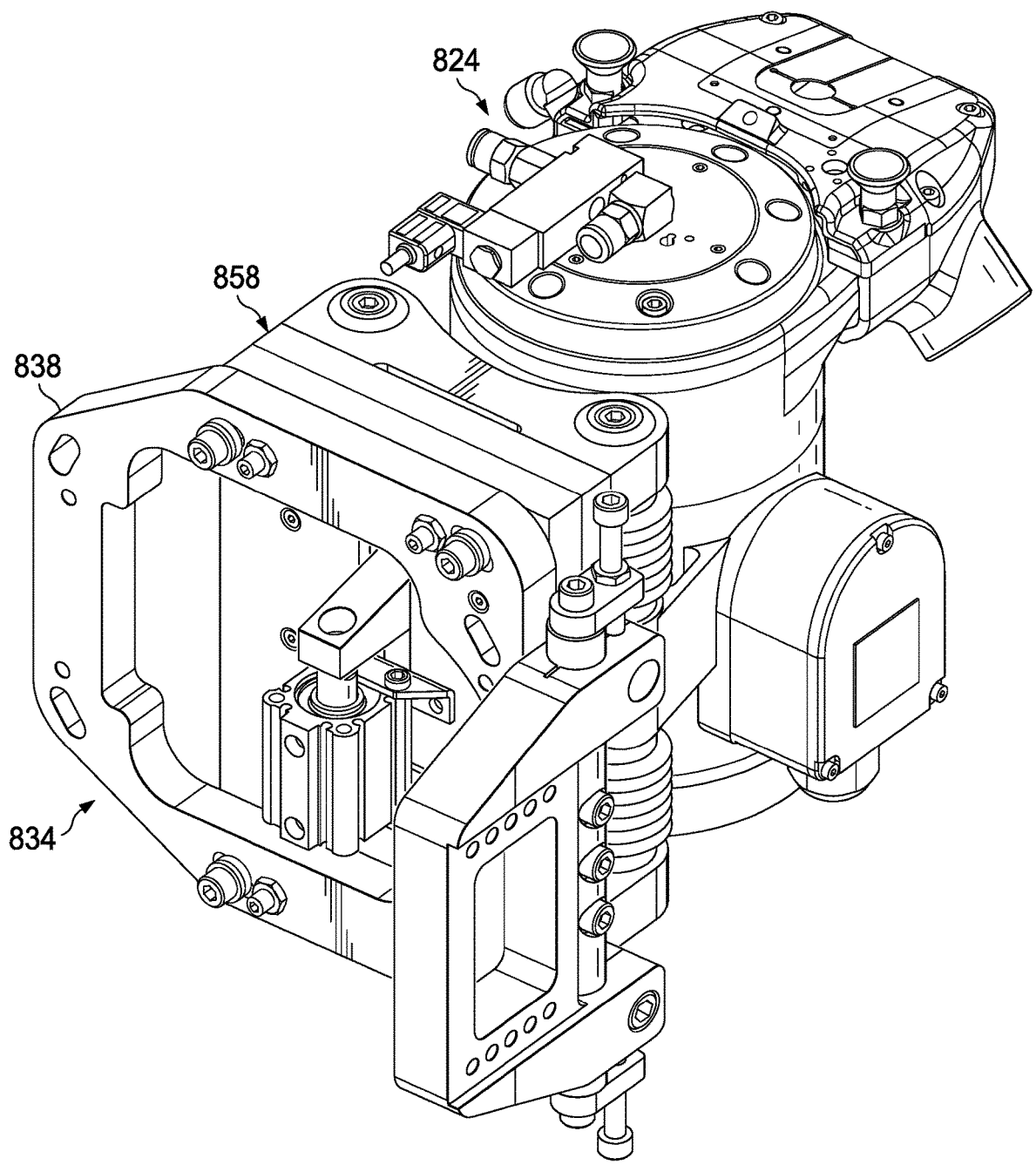
FIG. 26 is a front perspective view depicting an alternate embodiment of a lift assembly associated with the head of a swing arm.
Figure 27:
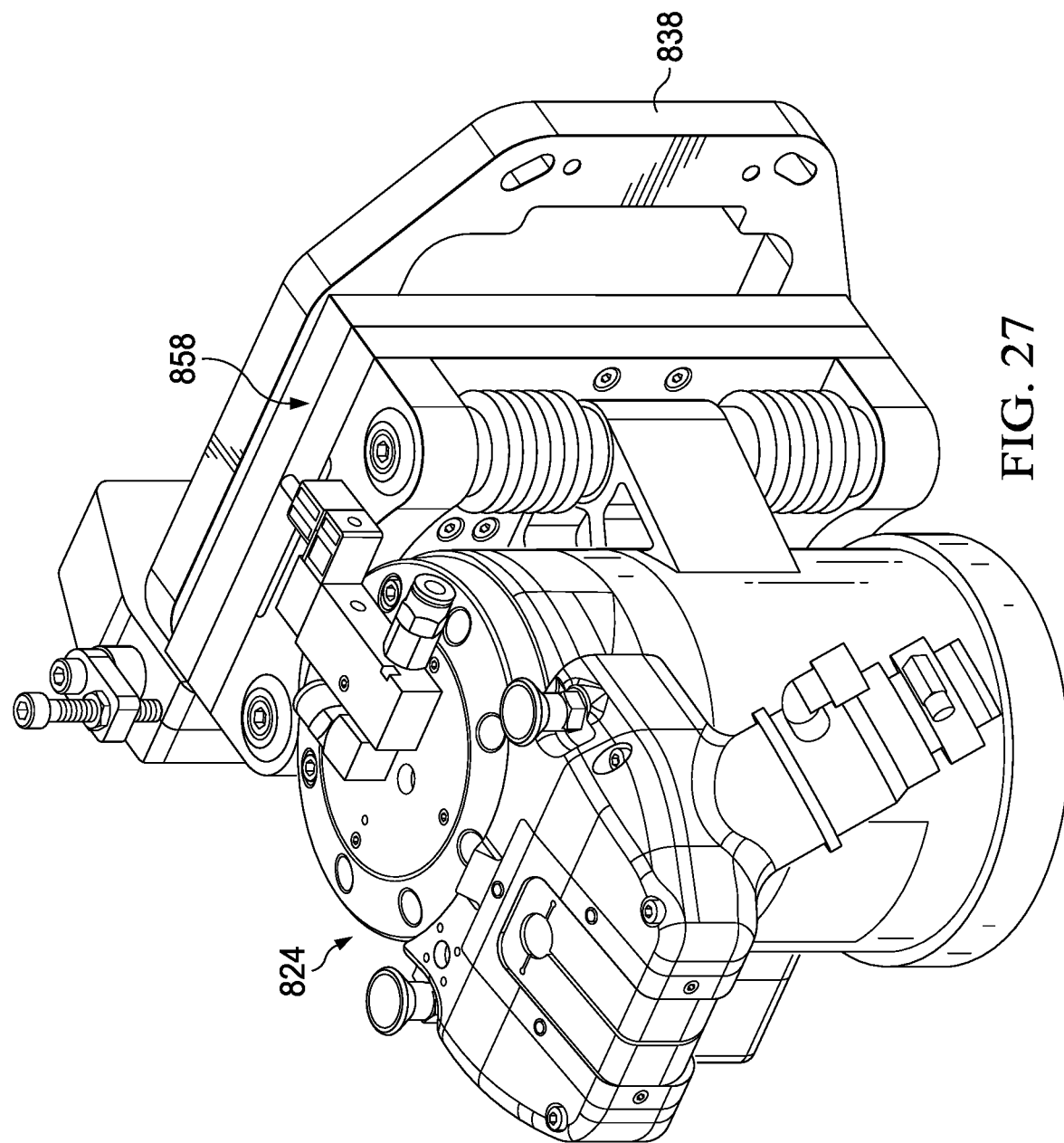
FIG. 27 is a rear perspective view depicting the head of the swing arm and lift assembly shown in FIG. 26.

FIGS. 26 and 27 illustrate another alternative embodiment of a head 834 for a swing arm assembly, the head 834 being similar to, or the same as in many respects as, the head 34 illustrated in FIGS. 1-5. For example, a tip dresser 824 can be mounted to a support plate 838 of the head 834. However, a lift assembly 858 can be releasably secured to the support plate 838 and can be operably coupled with the tip dresser 824. The lift assembly 858 can be configured to facilitate powered vertical movement of the tip dresser 824 for effective positioning of the tip dresser 824 with respect to welding tips.

Figure 29:
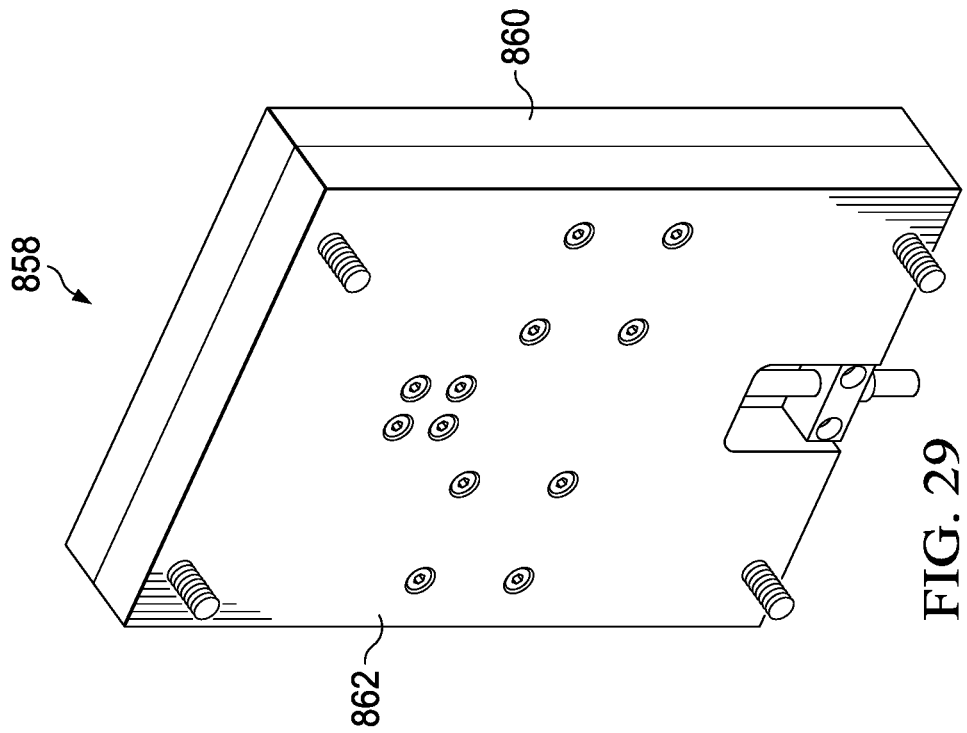
FIG. 29 is a rear perspective view depicting the lift assembly shown in FIG. 26.
Figure 28:
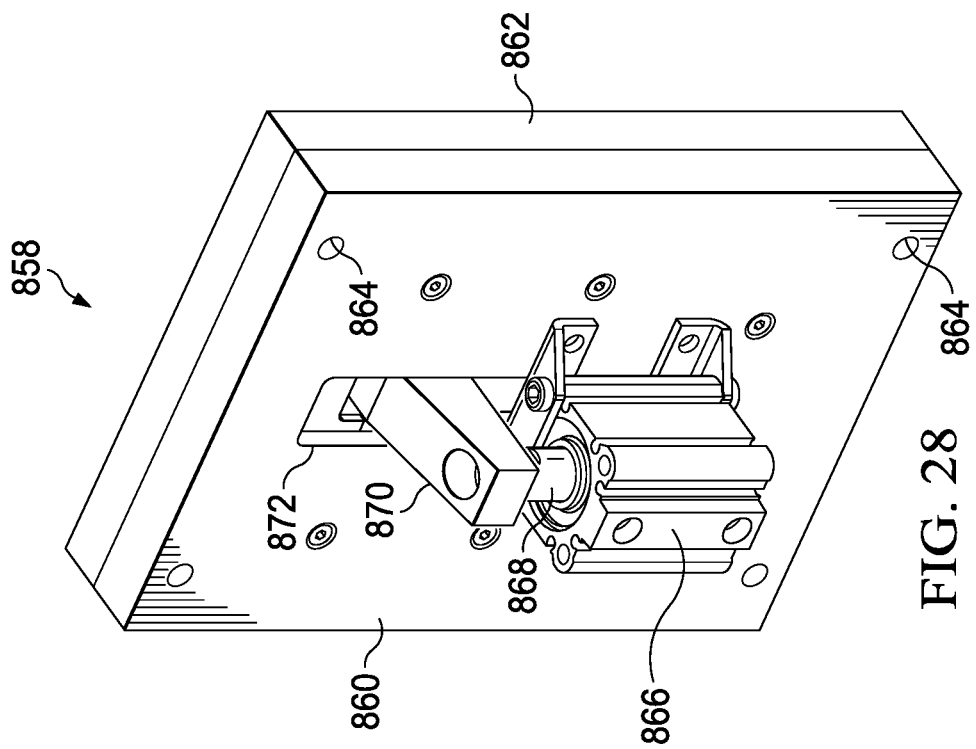
FIG. 28 is a front perspective view depicting the lift assembly shown in FIG. 26.

FIGS. 28 and 29 depict a front and back perspective view of the lift assembly 858 shown in FIGS. 26 and 27. The lift assembly 858 can include a mounting plate 860 and a slidable plate 862. The slidable plate 862 can be slidably coupled with the mounting plate 860 and slidable with respect to the mounting plate along an axis A3 to facilitate powered vertical positioning of the tip dresser 824 with respect to welding tips. The mounting plate 860 can be selectively coupled with the support plate 838. The mounting plate 860 can define apertures 864 that can receive one or a plurality of fasteners to attach the lift assembly 858 to the support plate 838. A actuator 866 can be coupled with the mounting plate 860 such that the actuator 866 is fixed to the mounting plate 860. The actuator 866 can be configured to facilitate selective sliding of the slidable plate 862 with respect to the mounting plate 860. The actuator 866 can include an piston 868 that is engaged with a flange 870 that is coupled with the slidable plate 862. The piston 868 can be selectively extendible (e.g., pneumatically or electrically) to urge a flange 870 in a generally upward or downward direction. The flange 870 can extend through a slot 872 defined by the mounting plate 860. The slot 872 can be sized to support a desired range of motion for the flange 870 as the piston 868 is urged in an upward or downward direction. The slidable plate 862 can be coupled with a tip dresser. It will be appreciated that the slidable plate 862 can be actuated along any suitable axis, such as a substantially vertical axis, where the axis and range of movement can vary depending upon the needs of a specific application. It is also to be appreciated that any of a variety of suitable alternative arrangements for moving and/or selectively positioning the slidable plate 862 with respect to the mounting plate 860 are contemplated. For example, the mounting plate 860 and the slidable plate 862 can be movable coupled together via internally machined features such as a worm gear or other mechanism that is selectively driven by a suitable motive source. In another example, a motive source can be integrated directly into one of the mounting plate 860 and the slidable plate 862 to facilitate movement therebetween.

There may be a number of advantages to the system described in FIGS. 26-29 When a swing arm is in the "work" position, a valve (not shown) can actuate the actuator 858 attached to the slidable plate 862. The actuator 858 can extend or retract to push or pull the slidable plate 862 on which the dresser is mounted until a stationary cap is almost touching the cutter blade of the tip dresser. Such a design can maximize weld cap life, where in a standard application, the moveable cap on the weld gun generally closes on the tip dresser and compresses the self-equalizing springs on the tip dresser until the cutter blade makes contact with the stationary cap. With such systems the moveable weld cap is being dressed while it is pushing the dresser down towards the stationary cap, causing uneven amounts of material removed from each cap. The lift assembly 858 may provide for a more even amount of material being removed from each cap by controlling the position of the tip dresser relative to the cap. The actuator 866 and associated piston 868 can be associated with any suitable controller or control logic to precisely and/or optimally position the tip dresser.

Figure 30:
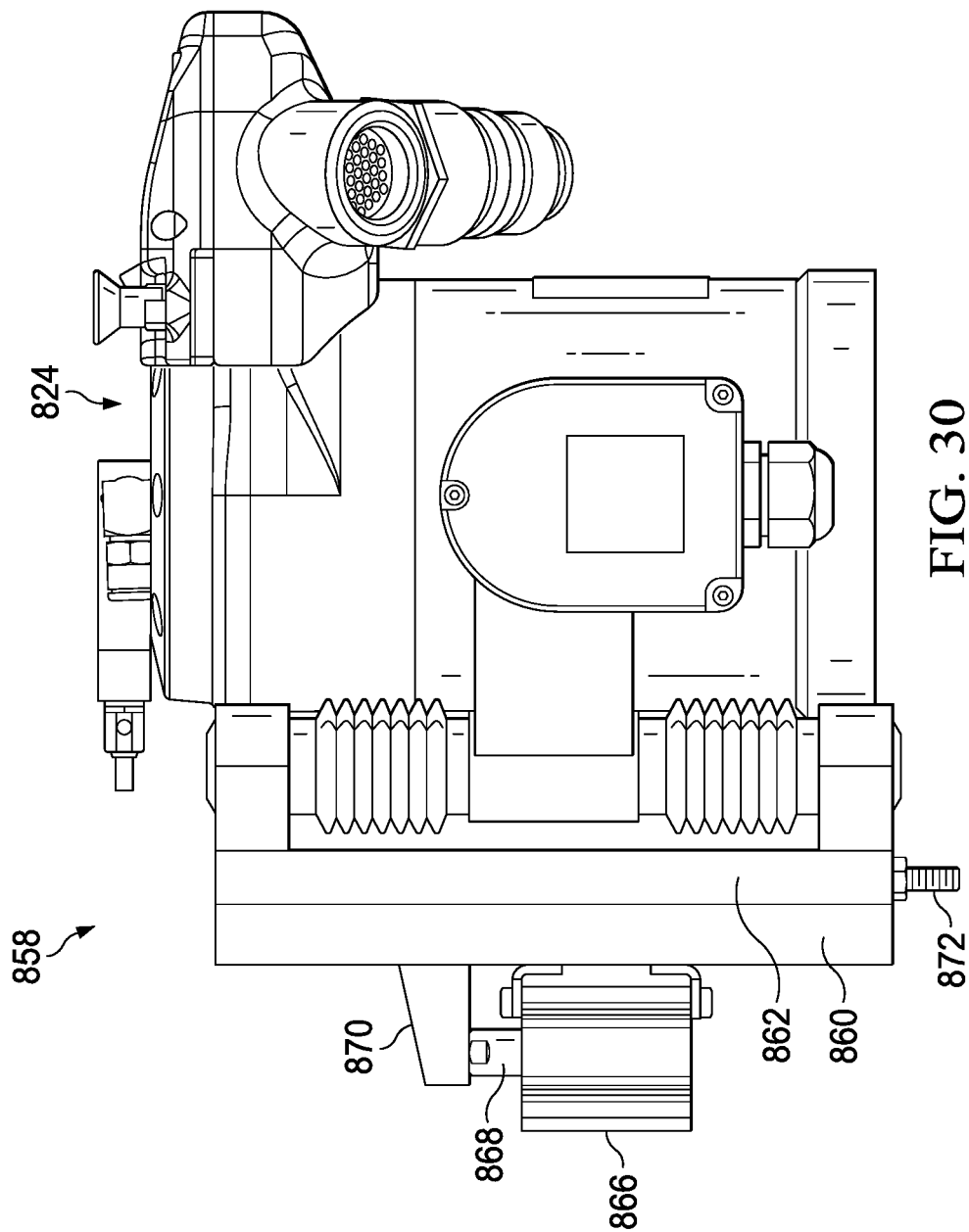
FIG. 30 is a side view depicting the lift assembly of FIG. 26 shown attached to a tip dresser.

FIG. 30 depicts a side view of the lift assembly 858 coupled with a tip dresser 824. The lift assembly 858 can include an adjustment screw 872, which can be coupled with the slidable plate 862, to allow an operator to control the work position of the moveable plate 862. The work position can be the position where tip dressing occurs. It will be appreciated that any suitable adjustment mechanism can be provided to improve the accuracy of position of the tip dresser.

Figure 31:
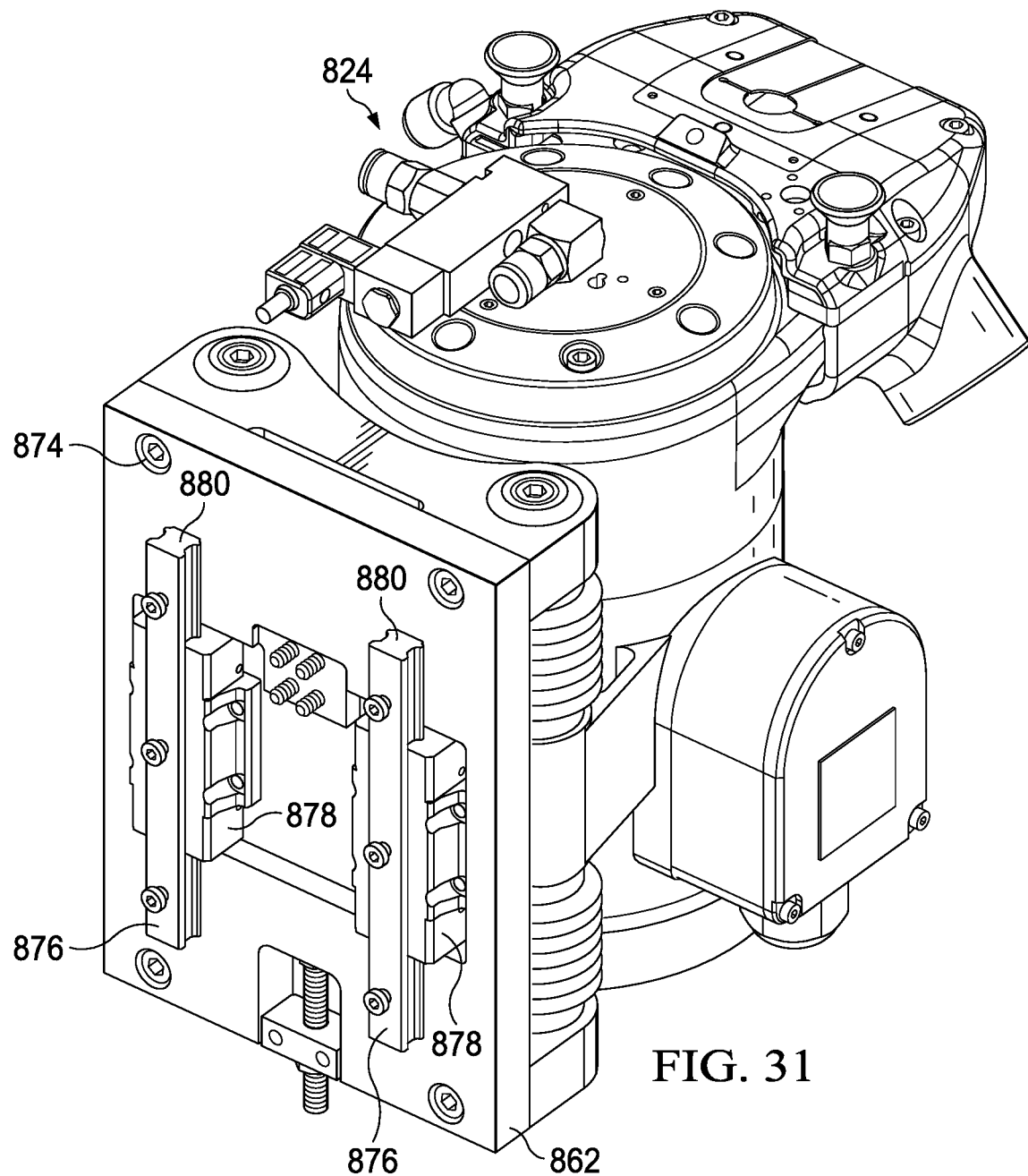
FIG. 31 is a front perspective view depicting a slidable plate associated with the lift assembly shown in FIG. 26, where a mounting plate associated with the lift assembly is shown removed to display a pair of rails slidably engaged with a pair of tracks.

FIG. 31 depicts a partial perspective view showing only the slidable plate 862 of the lift assembly 858 coupled with the tip dresser 824. The slidable plate 862 can define a plurality of apertures 874 or other attachment features to facilitate coupling with the tip dresser 824. The lift assembly 858 can include a pair of rails 876 and a pair of tracks 878 that are coupled with the mounting plate 860 and the slidable plate 862, respectively, and cooperate with each other to facilitate sliding of the slidable plate 862 with respect to the mounting plate 860. In one embodiment, the pair of rails 876 can be releasably attached to the mounting plate 860 and the pair of tracks 878 can be mounted to the slidable plate 862. The rails 876 can include an elongate body 878 having a neck 880. The neck 880 of the rails 876 can engage the tracks 878 such that the rails 876 are slidable, but not detachable, from the tracks 878. Such a configuration can facilitate relative movement between the moveable plate 862 and the mounting plate 860 while keeping the plates 860, 862 securely coupled together. The incorporation of dedicated rails and tracks can also reduce wear and tear that may be associated with two plates directly rubbing against one another during use.

Figure 33:
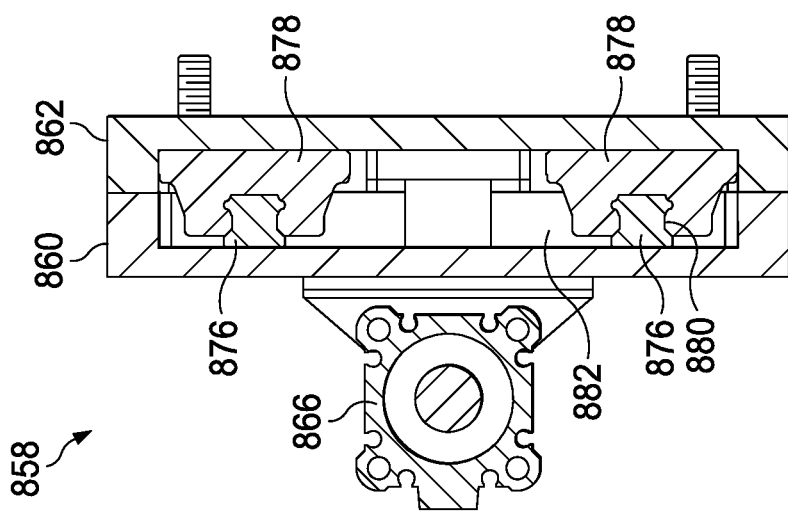
FIG. 33 is a cross-sectional view taken along the line 33-33 in FIG. 32.
Figure 32:
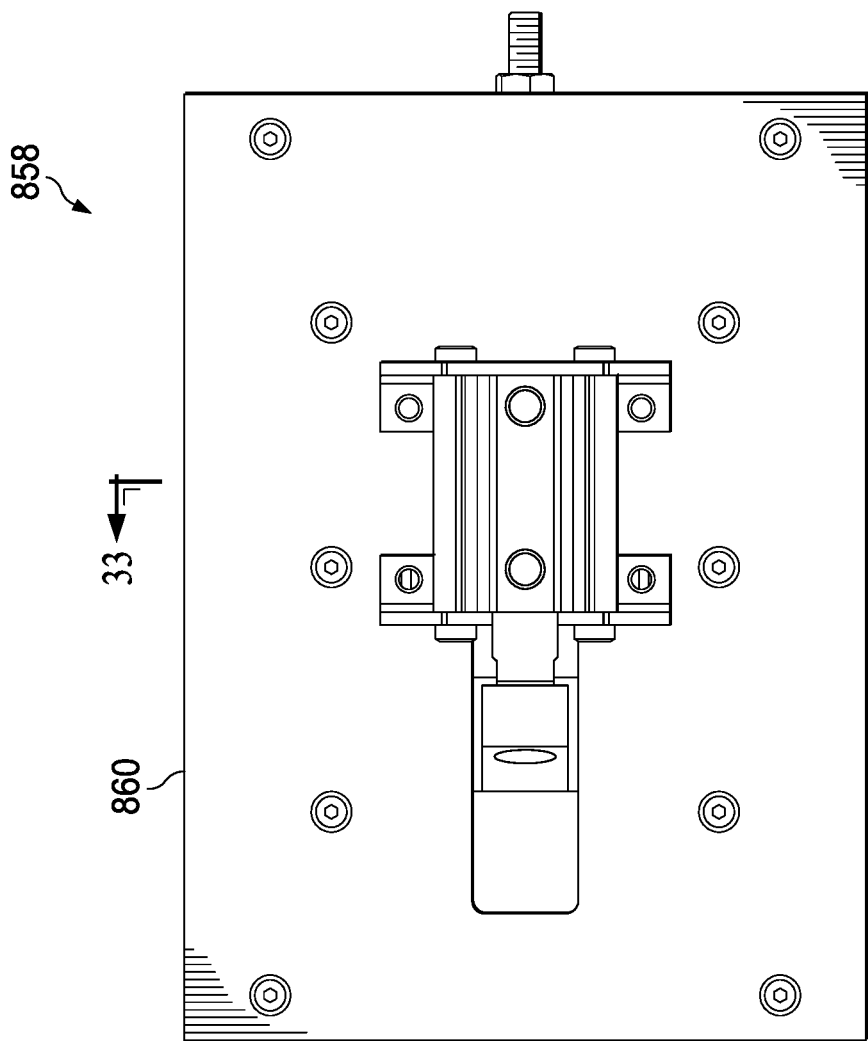
FIG. 32 is a front view depicting the lift assembly shown in FIG. 26.

FIG. 33 illustrates a front view of the lift assembly 858 taken along the line 33-33 in FIG. 32. As illustrated in FIG. 33, the rails 876 can be coupled with the mounting plate 860 and tracks 878 can be coupled to the slidable plate 862. Any suitable relationship between the slidable plate and the mounting plate is contemplated. As illustrated in FIG. 33, the mounting plate 860 and the slidable plate 862 can also cooperate to define a cavity 882 in which any suitable tracks, rails, mounting features, or the like, can be contained. Providing such a cavity can conceal tracks and the like that could present a pinch hazard during operation.

It is to be appreciated that in some embodiments a swing arm assembly can include a linear servo actuator, a linear electromechanical actuator, a rotary servo, a motor associated with a gearbox, or any of a variety of suitable alternative arrangements that is/are operable to facilitate pivoting of an arm assembly with respect to a mounting base. An example of such a swing arm assembly is disclosed in U.S. patent application Ser. No. 15/286,007 which is incorporated herein in its entirety.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto.

What is claimed is:

1. A swing arm for one or more of a tip dresser and a tip exchanger for a spot welding machine, the swing arm comprising:
    a base;
    an arm pivotally coupled with the base; and
    a head coupled with the arm, the head comprising:
        a support plate; and
        a lift assembly comprising:
            a mounting plate coupled with the support plate;
            a slidable plate slidably coupled with the mounting plate and configured to accommodate one or more of a tip dresser and a tip exchanger, the slidable plate being slidable with respect to the mounting plate along an axis; and
            an actuator coupled with the mounting plate and configured to facilitate selective sliding of the slidable plate with respect to the mounting plate, wherein:
                the mounting plate comprises a flange that is engaged with the actuator; and
                the mounting plate defines a slot and the flange extends through the slot.

2. The swing arm of claim 1 wherein the actuator comprises a piston that is engaged with the mounting plate.

3. The swing arm of claim 2 wherein the piston is electrically powered.

4. The swing arm of claim 1 further comprising a rail and a track that cooperate with each other to facilitate sliding of the slidable plate with respect to the mounting plate.

5. The swing arm of claim 4 wherein the rail is coupled to the mounting plate and the track is coupled to the slidable plate.

6. The swing arm of claim 5 wherein the rail includes an elongate body comprising a neck that engages the track such that the rail is slidable, but not detachable, from the track.

7. A lift assembly for a swing arm for one or more of a tip dresser and a tip exchanger for a spot welding machine, the lift assembly comprising:
    a mounting plate coupled with a support plate;
    a slidable plate slidably coupled with the mounting plate and configured to accommodate one or more of a tip dresser and a tip exchanger, the slidable plate being slidable with respect to the mounting plate along an axis; and
    an actuator coupled with the mounting plate and configured to facilitate selective sliding of the slidable plate with respect to the mounting plate, wherein:
        the mounting plate comprises a flange that is engaged with the actuator; and
        the mounting plate defines a slot and the flange extends through the slot.

8. The lift assembly of claim 7 wherein the actuator comprises a piston that is engaged with the mounting plate.

9. The lift assembly of claim 8 wherein the piston is electrically powered.

10. The lift assembly of claim 7 further comprising a rail and a track that cooperate with each other to facilitate sliding of the slidable plate with respect to the mounting plate.

11. The lift assembly of claim 10 wherein the rail is coupled to the mounting plate and the track is coupled to the slidable plate.

12. The lift assembly of claim 11 wherein the rail includes an elongate body comprising a neck that engages the track such that the rail is slidable, but not detachable, from the track.

13. A swing arm for one or more of a tip dresser and a tip exchanger for a spot welding machine, the swing arm comprising:
    a base;
    an arm pivotally coupled with the base; and
    a head coupled with the arm, the head comprising:
        a support plate; and
        a lift assembly comprising:
            a mounting plate coupled with the support plate;
            a slidable plate slidably coupled with the mounting plate and configured to accommodate one or more of a tip dresser and a tip exchanger, the slidable plate being slidable with respect to the mounting plate along an axis;
            an actuator coupled with the mounting plate and configured to facilitate selective sliding of the slidable plate with respect to the mounting plate, the actuator comprising a piston that is engaged with the mounting plate; and
            a rail and a track that cooperate with each other to facilitate sliding of the slidable plate with respect to the mounting plate, wherein:
                the mounting plate comprises a flange that is engaged with the piston; and
                the mounting plate defines a slot and the flange extends through the slot.

14. The swing arm of claim 13 wherein the rail is coupled to the mounting plate and the track is coupled to the slidable plate and wherein the rail includes an elongate body comprising a neck that engages the track such that the rail is slidable, but not detachable, from the track.

* * * * *